(12) United States Patent
Yumiki

(10) Patent No.: US 8,704,905 B2
(45) Date of Patent: Apr. 22, 2014

(54) CAMERA BODY AND CAMERA SYSTEM

(71) Applicant: Panasonic Corporation, Osaka (JP)

(72) Inventor: Naoto Yumiki, Osaka (JP)

(73) Assignee: Panasonic Corporation, Osaka (JP)

(*) Notice: Subject to any disclaimer, the term of this patent is extended or adjusted under 35 U.S.C. 154(b) by 0 days.

(21) Appl. No.: 13/729,173

(22) Filed: Dec. 28, 2012

(65) Prior Publication Data

US 2013/0113983 A1   May 9, 2013

Related U.S. Application Data

(63) Continuation of application No. 12/581,286, filed on Oct. 19, 2009, now Pat. No. 8,368,769, which is a continuation of application No. PCT/JP2008/002299, filed on Aug. 25, 2008.

(30) Foreign Application Priority Data

Aug. 29, 2007   (JP) ................. 2007-222395

(51) Int. Cl.
*H04N 5/225* (2006.01)
*H04N 5/77* (2006.01)

(52) U.S. Cl.
CPC .................... *H04N 5/772* (2013.01)
USPC ...................... 348/220.1; 348/341

(58) Field of Classification Search
CPC . H04N 5/772; H04N 5/23245; H04N 1/2112; H04N 5/23293; H04N 5/2251; H04N 5/2351; H04N 5/23209; H04N 5/232; H04N 2101/00; H04N 2201/0084; G02B 7/102; G02B 7/34; G02B 7/36; G02B 7/08; G03B 17/14; G03B 3/10; G03B 7/10
USPC .......... 348/220.1, 341, 207.99, 362; 396/90–91
See application file for complete search history.

(56) References Cited

U.S. PATENT DOCUMENTS

| | | | |
|---|---|---|---|
| 4,553,170 A | 11/1985 | Aoki et al. | |
| 6,882,369 B1 * | 4/2005 | Ito | 348/345 |
| 7,193,651 B2 | 3/2007 | Kato | |
| 7,408,586 B2 * | 8/2008 | Ueda et al. | 348/372 |

(Continued)

FOREIGN PATENT DOCUMENTS

| | | |
|---|---|---|
| JP | 5-072792 B | 10/1993 |
| JP | 2001-125173 A | 5/2001 |

(Continued)

OTHER PUBLICATIONS

International Search Report of PCT Application No. PCT/JP2008/002299 dated Mar. 5, 2009.

*Primary Examiner* — Aung S Moe

(74) *Attorney, Agent, or Firm* — Panasonic Patent Center

(57) ABSTRACT

A camera body including a mirror controller configured to retract the reflecting mirror out of the optical path of the optical system when the reflecting mirror is in the first state of being in the optical path of the optical system and the moving picture photography mode is selected, in the still picture photography mode. The image recording controller is configured to perform the autofocusing operation by contrast method and make the recorder to record moving images depending on an instruction of the moving picture photography when the moving picture photography mode is selected and the mirror controller retracts the reflecting mirror out of the optical path of the optical system, in the still picture photography mode.

2 Claims, 18 Drawing Sheets

(56) References Cited

U.S. PATENT DOCUMENTS

| | | |
|---|---|---|
| 7,414,664 B2 | 8/2008 | Suda |
| 7,483,072 B2 | 1/2009 | Oikawa .......................... 348/345 |
| 7,548,267 B2 | 6/2009 | Kosugiyama ................. 348/344 |
| 7,609,294 B2 | 10/2009 | Sugawara .................. 348/220.1 |
| 7,844,176 B2 * | 11/2010 | Kunishige et al. ............ 396/128 |
| 7,847,853 B2 | 12/2010 | Suda ............................ 348/341 |
| 7,889,268 B2 | 2/2011 | Terada ......................... 348/345 |
| 8,111,323 B2 | 2/2012 | Ueda et al. ................... 348/372 |
| 8,169,529 B2 | 5/2012 | Kajimura ...................... 348/341 |
| 8,203,642 B2 * | 6/2012 | Sogawa et al. ............... 348/345 |
| 2001/0026683 A1 * | 10/2001 | Morimoto et al. .............. 396/89 |
| 2002/0171750 A1 | 11/2002 | Kato |
| 2004/0155976 A1 | 8/2004 | Suda |
| 2005/0237421 A1 | 10/2005 | Kosugiyama ................. 348/360 |
| 2006/0087573 A1 | 4/2006 | Harada ......................... 348/294 |
| 2006/0098115 A1 | 5/2006 | Toyoda ......................... 348/362 |
| 2006/0215040 A1 | 9/2006 | Sugawara .................. 348/220.1 |
| 2007/0212056 A1 | 9/2007 | Nagata .......................... 396/354 |
| 2007/0253692 A1 | 11/2007 | Terada ............................ 396/89 |
| 2007/0280673 A1 | 12/2007 | Mikami et al. ................ 396/354 |
| 2008/0030594 A1 * | 2/2008 | Terada ....................... 348/221.1 |
| 2008/0118238 A1 * | 5/2008 | Sogawa et al. ................ 396/128 |
| 2009/0310012 A1 * | 12/2009 | Ueda et al. .................... 348/348 |
| 2011/0115966 A1 * | 5/2011 | Ueda et al. .................... 348/345 |
| 2013/0141632 A1 * | 6/2013 | Shintani et al. ............... 348/353 |

FOREIGN PATENT DOCUMENTS

| | | |
|---|---|---|
| JP | 2001-275033 A | 10/2001 |
| JP | 2002-300435 A | 10/2002 |
| JP | 2003-015016 A | 1/2003 |
| JP | 2004-109831 A | 4/2004 |
| JP | 2004-264832 A | 9/2004 |
| JP | 2005-275415 A | 10/2005 |
| JP | 2005-275416 A | 10/2005 |
| JP | 2005-295577 A | 10/2005 |
| JP | 2005-311764 A | 11/2005 |

\* cited by examiner

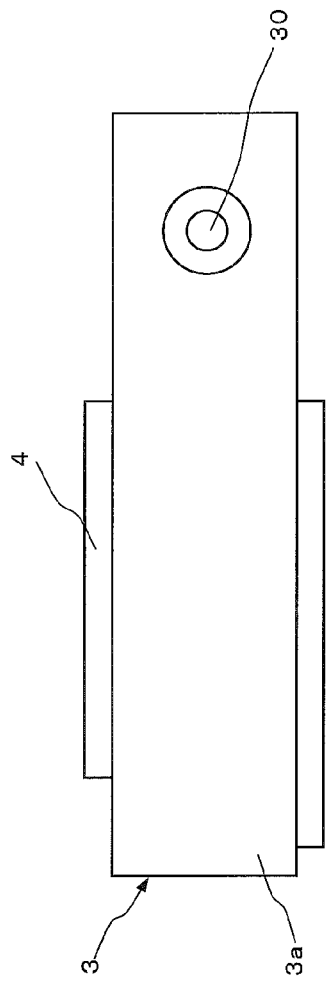
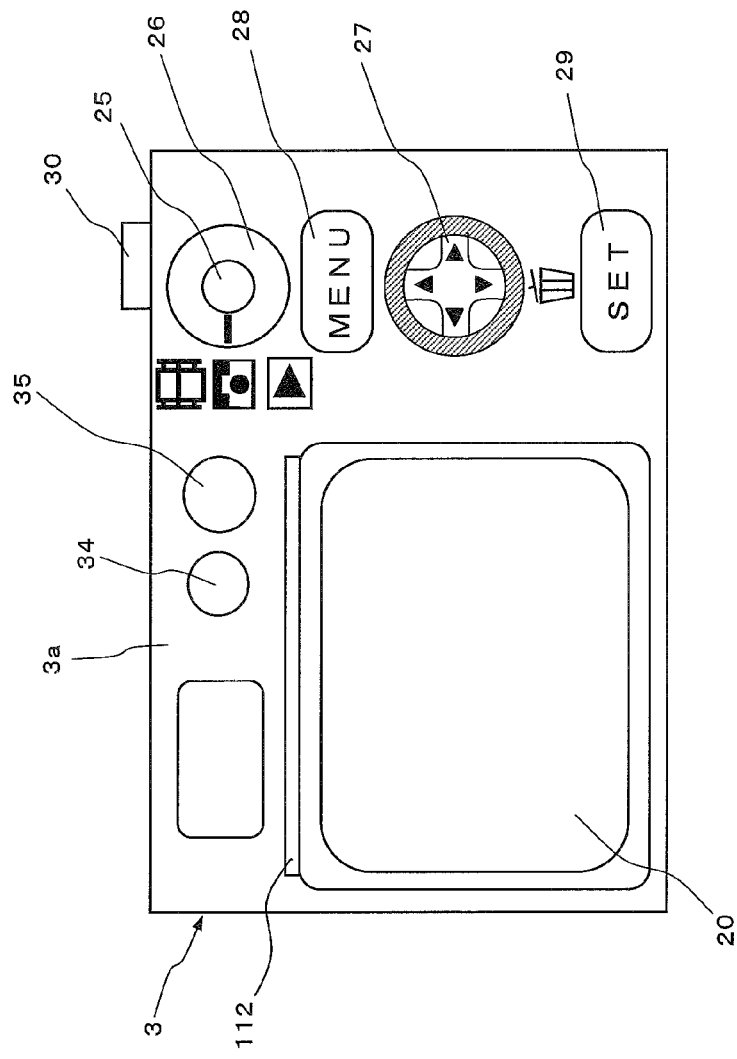
Fig. 3A
Fig. 3B

CAMERA BODY AND CAMERA SYSTEM

CROSS-REFERENCE TO RELATED APPLICATIONS

This application is a continuation application of U.S. application Ser. No. 12/581,286 filed on Oct. 19, 2009. U.S. application Ser. No. 12/581,286 is a continuation of International Patent Application No. PCT/JP2008/002299 filed on Aug. 25, 2008. The entire disclosure of International Application No. PCT/JP2008/002299 is hereby incorporated herein by reference.

This application claims priority to Japanese Patent Application No. 2007-222395. The entire disclosure of Japanese Patent Application No. 2007-222395 is hereby incorporated herein by reference.

BACKGROUND

1. Technical Field

The technical field relates to a camera system, and more particularly relates to a system used in digital single lens reflex cameras of the interchangeable lens type.

2. Description of the Related Art

Digital single lens reflex cameras with which an optical image of a subject can be converted into an electrical image signal and outputted have rapidly grown in popularity in recent years. With these digital single lens reflex cameras, when the user looks through the viewfinder to view a subject, the light that is incident on the imaging lens (that is, the subject image) is reflected by a reflecting mirror disposed along the imaging optical path beyond the lens, and this changes the optical path to go through a pentaprism or the like and obtains a positive image that is guided to the optical viewfinder, allowing the subject image that has passed through the lens to be seen through the optical viewfinder. Therefore, the position where the viewfinder optical path is formed is usually the home position of the reflecting mirror.

Meanwhile, when a lens is used for imaging, the reflecting mirror instantly changes its position, and is retracted from the imaging optical path, which switches the viewfinder optical path to the imaging optical path, and instantly returns to its home position as soon as imaging is complete. This method is common to a conventional film camera and a digital camera.

One of the features of a digital camera is that an image can be captured while the user looks at a display device (such as a liquid crystal monitor), and the captured image can be checked right after it is captured. However, when a conventional single reflex lens reflecting mirror is used, a liquid crystal monitor cannot be used during image capture. This means that image capture cannot be performed using a liquid crystal monitor, and the user instead has to look through the viewfinder, and this makes the camera very difficult to use for a novice who is inexperienced with digital camera photography.

In view of this, a digital single lens reflex camera has been proposed with which images can be captured while the user looks at a liquid crystal monitor, for example (see Japanese Laid-Open Patent Application 2001-125173, for instance).

Also, in recent years consumers have wanted digital single lens reflex cameras that are not only capable of capturing still pictures, but also have functions such as capturing moving pictures.

With the digital single lens reflex camera disclosed in Japanese Laid-Open Patent Application 2001-125173, however, the capture of moving pictures is not taken into account, so even if an interchangeable lens that is compatible with moving picture capture is mounted to the camera body, it may still be impossible to capture moving pictures, which is inconvenient to the user.

SUMMARY

A camera body according to a first aspect is used in a camera system along with an interchangeable lens unit having an optical system configured to form an optical image of a subject. This camera body comprises an imaging unit, an autofocusing unit, a still picture photography mode select section, a moving picture photography mode select section, a display unit, a recorder, a mirror controller and an image recording controller. The imaging unit is configured to convert the optical image into an image signal and acquire an image of the subject. The autofocusing unit is configured to detect the best focus in autofocusing operation by contrast method by using the imaging unit. The still picture photography mode select section is configured to be set for capturing a still picture. The moving picture photography mode select section is configured to be set in a moving picture photography mode for capturing a moving picture in the second state. The display unit is configured to display the image captured by the imaging unit as a through image in a moving picture photography mode. The recorder is configured to record the still image and the moving picture. The mirror controller is configured to retract the reflecting mirror out of the optical path of the optical system when the reflecting mirror is in the first state of being in the optical path of the optical system and the moving picture photography mode is selected, in the still picture photography mode. The image recording controller is configured to perform the autofocusing operation by contrast method and make the recorder to record moving images depending on an instruction of the moving picture photography when the moving picture photography mode is selected and the mirror controller reacts the reflecting mirror out of the optical path of the optical system, in the still picture photography mode.

A camera body according to a second aspect is a camera body according to the first aspect, further comprising a focal point detection unit. The focal point detection unit is configured to detect focal point. The autofocusing method is switched from a phase difference detection method by using the focal point detection unit to the contrast method when the moving picture photography mode is selected.

A camera body according to a third aspect comprises an optical system, an imaging unit, an autofocusing unit, a still picture photography mode select section, a moving picture photography mode select section, a display unit, a recorder, a mirror controller and an image recording controller. The optical system is configured to form an optical image of a subject. The imaging unit is configured to convert the optical image into an image signal and acquire an image of the subject. The autofocusing unit is configured to detect the best focus in autofocusing operation by contrast method by using the imaging unit. The still picture photography mode select section is configured to be set for capturing a still picture. The moving picture photography mode select section is configured to be set in a moving picture photography mode for capturing a moving picture in the second state. The display unit is configured to display the image captured by the imaging unit as a through image in a moving picture photography mode. The recorder is configured to record the still image and the moving picture. The mirror controller is configured to retract the reflecting mirror out of the optical path of the optical system when the reflecting mirror is in the first state of being in the optical path of the optical system and the moving picture photography mode is selected, in the still picture photography mode. The image recording controller is configured to perform the autofocusing operation by contrast method and make the recorder to record moving images depending on an instruction of the moving picture photography when the moving picture photography mode is selected and the mirror controller reacts the reflecting mirror out of the optical path of the optical system, in the still picture photography mode.

A camera system according to a fourth aspect is a camera system according to the third aspect, further comprising a focal point detection unit. The focal point detection unit is configured to detect focal point. The autofocusing method is switched from a phase difference detection method by using the focal point detection unit to the contrast method when the moving picture photography mode is selected.

BRIEF DESCRIPTION OF THE DRAWINGS

Referring now to the attached drawings which form a part of this original disclosure:

FIG. 3A is a simplified diagram of the configuration of a camera body, and FIG. 3B is a simplified diagram of the configuration of a camera body;

DETAILED DESCRIPTION OF THE PREFERRED EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment

1: Overall Configuration of Camera System

Figure 1:
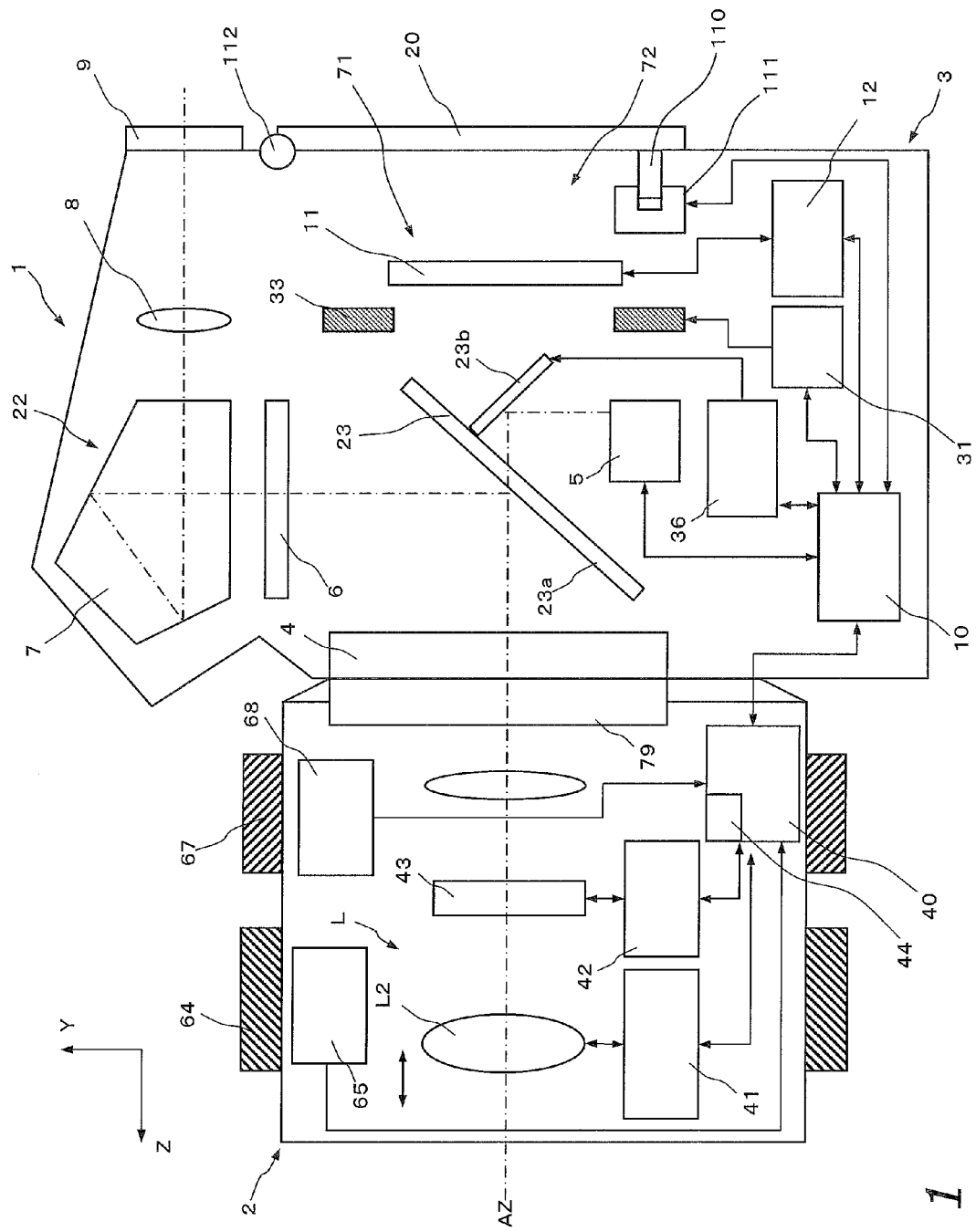
FIG. 1 is a block diagram of the configuration of a camera system.
Figure 2:
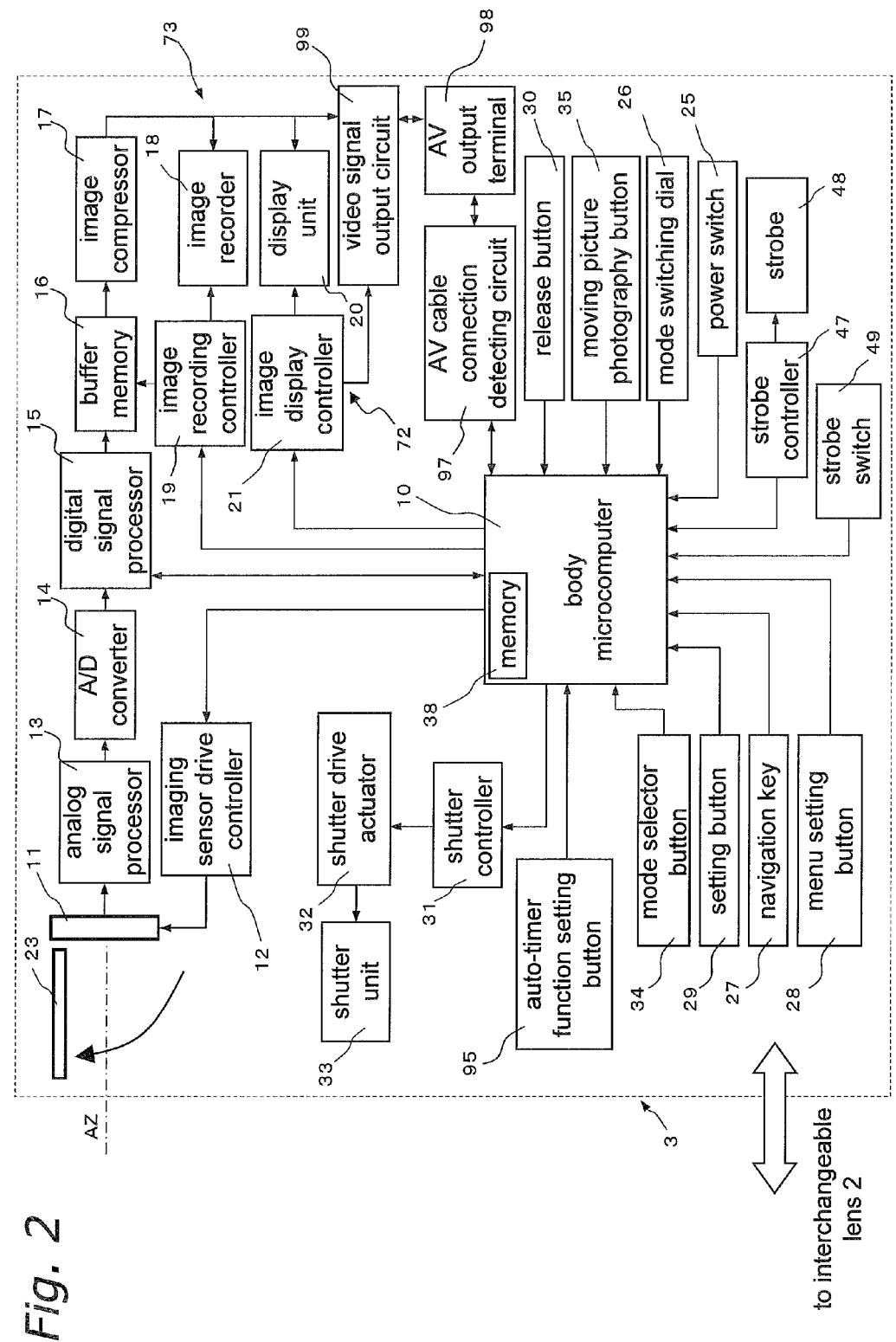
FIG. 2 is a block diagram of the configuration of a camera body.

The overall configuration of the camera system 1 according to the first embodiment will now be described through reference to FIGS. 1 to 3. FIG. 1 is a block diagram of the camera system 1. FIG. 2 is a block diagram of the camera body 3. FIGS. 3A and 3B are simplified configuration diagrams of the camera body 3B.

As shown in FIG. 1, the camera system 1 is an interchangeable lens type of digital single lens reflex camera, and mainly includes a camera body 3 having the main functions of the camera system 1, and an interchangeable lens unit 2 that is removably mounted to the camera body 3. The interchangeable lens unit 2 is mounted to a body mount 4 (an example of a mounting unit) provided to the front face of the camera body 3 via a lens mount 79.

1.1: Camera Body

As shown in FIGS. 1 and 2, the camera body 3 mainly includes an imaging unit 71 that captures images of a subject, a body microcomputer 10 serving as a body controller that controls the various operations of the imaging unit 71 and so forth, an image display unit 72 that displays various information and captured images, an image storage unit 73 that stores image data, and a viewfinder optical system 22 through which a subject image is viewed.

The imaging unit 71 mainly includes a quick return mirror 23 that guides incident light to the viewfinder optical system 22 and a focal point detection unit 5, an imaging sensor 11 such as a CCD (charge coupled device) that performs optoelectric conversion, a shutter unit 33 that adjusts the exposure state of the imaging sensor 11, a shutter controller 31 that controls the drive of the shutter unit 33 on the basis of a control signal from the body microcomputer 10, an imaging sensor drive controller 12 that controls the operation of the imaging sensor 11, and the focal point detection unit 5 that detects the focal point (the focused state of the subject image). The focal point detection unit 5 performs focal point detection by a standard phase difference detection method, for example. Depending on how the camera system 1 is used, two different methods can be used for focal point detection, namely, a phase difference detection method in which the above-mentioned focal point detection unit 5 is used, or a contrast detection method based on the image signal outputted from the imaging sensor 11. In the case of a contrast detection method, a contrast value is found and the focal point is detected by the body microcomputer 10. Specifically, the body microcomputer 10 can be said to include a contrast detector. This focal point detection result is sent to the lens microcomputer 40 (discussed below) and used to drive a focus lens group (second lens group L2).

The imaging sensor 11 is, for example, a CCD (charge coupled device) sensor that converts an optical image formed by an imaging optical system L into an electrical signal. The imaging sensor 11 is driven by a timing signal generated by the imaging sensor drive controller 12. The imaging sensor 11 may also be a CMOS (complementary metal-oxide semiconductor) sensor.

The body microcomputer 10 is the main control apparatus for the camera body 3, and controls various sequences. More specifically, a CPU, ROM, and RAM are installed in the body microcomputer 10, and the CPU reads the programs loaded in the ROM, which allows the body microcomputer 10 to carry out its various functions. For example, the body microcomputer 10 has the function of detecting that the interchangeable lens 2 has been mounted to the camera body 3, the function of controlling the operation of the interchangeable lens unit 2 and acquiring information that is essential to controlling the camera system 1, such as focal length information, from the interchangeable lens unit 2, and so forth. The body microcomputer 10 also has the function of determining whether or not the interchangeable lens unit 2 is compatible with moving picture photography (determination unit), and the function of setting the operation of the imaging sensor 11 to either a still picture photography mode or a moving picture photography mode via the imaging sensor drive controller 12. As shown in FIG. 1, the body microcomputer 10 is connected to the various components provided to the camera body 3.

The body microcomputer 10 is also able to receive signals (an example of first operation information) from a power switch 25 (shown in FIG. 3B), a release button 30, a mode switching dial 26, a cross key 27, a menu setting button 28, a set button 29, a viewfinder switching button 34, and a moving picture photography button 35. The body microcomputer 10 is an example of a determination unit, a detector, and a device detector.

Furthermore, as shown in FIG. 2, various information related to the camera body 3 (body information) is stored in a memory 38 in the body microcomputer 10. This body information includes, for example, the name of the manufacturer of the camera body 3, the manufacture date, the model number, the version of software installed in the body microcomputer 10, information related to firmware updates, and other such information related to the model for specifying the camera body 3 (camera specification information). Information sent from the lens microcomputer 40 can be stored in the memory 38.

The body microcomputer 10 controls the entire camera system, such as the imaging sensor 11, according to the operation of the release button 30 and the like. The body microcomputer 10 sends a vertical synchronization signal to a timing generator. Parallel with this, the body microcomputer 10 produces an exposure synchronization signal on the basis of the vertical synchronization signal. The body microcomputer 10 repeatedly and periodically sends the exposure synchronization signal thus produced to the lens microcomputer 40 through the body mount 4 and the lens mount 79.

The body mount 4 can be mechanically and electrically connected to the lens mount 79 of the interchangeable lens unit 2. The body mount 4 is able to exchange information with the interchangeable lens unit 2 via the lens mount 79. For example, the body mount 4 sends the exposure synchronization signal received from the body microcomputer 10 to the lens microcomputer 40 via the lens mount 79. Also, the body mount 4 sends other control signals received from the body microcomputer 10 to the lens microcomputer 40 via the lens mount 79. The body mount 4 also sends the body microcomputer 10 signals received from the lens microcomputer 40 via the lens mount 79. Also, the body mount 4 supplies the power supplied from a power supply unit (not shown) to the entire interchangeable lens unit 2 through the lens mount 79.

As shown in FIGS. 3A and 3B, the case 3a of the camera body 3 is supported by the user during photography of a subject. The rear face of the case 3a is provided with a display unit 20, the power switch 25, the mode switching dial 26, the cross key 27, the menu setting button 28, the set button 29, the viewfinder switching button 34, and the moving picture photography button 35.

The power switch 25 is used to switch on the power to the camera system 1 or the camera body 3. When the power is switched on with the power switch 25, power is supplied to the various components of the camera body 3 and the interchangeable lens unit 2. The mode switching dial 26 is used to switch between operating modes, such as the still picture photography mode, the moving picture photography mode, and the reproduction mode. The user can turn the mode switching dial 26 to switch the operating mode. When the still picture photography mode is selected with the mode switching dial 26, the operating mode is switched to the still picture photography mode, and when the moving picture photography mode is selected with the mode switching dial 26, the operating mode is switched to the moving picture photography mode. In the moving picture photography mode, moving picture photography is possible. Further, when the reproduction mode is selected with the mode switching dial 26, the operating mode is switched to the reproduction mode, and the captured image can be displayed on the display unit 20.

The menu setting button 28 is used to set the various operations of the camera system 1. The cross key 27 is a control member with which the user presses the top, bottom, left, or right part of the key to select the desired menu from the various menu screens displayed on the display unit 20. The set button 29 is used to execute the various menus. The viewfinder switching button 34 is used to switch photography modes between the viewfinder photography mode and the monitor photography mode. The moving picture photography button is used to start or stop moving picture photography. Whether the operating mode selected on the mode switching dial 26 is the moving picture photography mode or the still picture photography mode, pressing the moving picture photography button 35 forcibly sets the moving picture photography mode and starts moving picture photography, regardless of the setting on the mode switching dial 26. Furthermore, if the moving picture photography button 35 is pressed during moving picture photography, the moving picture photography is ended and the operating mode switches to the one selected on the mode switching dial 26, namely, the operating mode prior to the start of the moving picture photography. For example, if the still picture photography mode has been selected with the mode switching dial 26 when the moving picture photography button 35 is pressed, the operating mode automatically changes to the still picture photography mode after the moving picture photography button 35 has been pressed again.

In this embodiment, the "operating mode" refers to the function of the camera system 1, such as capturing or reproducing an image. In contrast, "photography mode" indicates the state of the camera system 1 selected in the capture of an image.

As shown in FIG. 3B, the release button 30 is provided to the top face of the case 3a. When the release button 30 is pressed, a timing signal is outputted to the body microcomputer 10. The release button 30 is a two-position switch that can be pressed halfway or all the way down. When the user presses the release button 30 halfway down, processing for light metering and ranging begins. Pressing the button halfway down also supplies power to the various components, including the body microcomputer 10 and the lens microcomputer 40. When the release button 30 is then pressed all the way down, a timing signal is outputted to the body microcomputer 10. The shutter controller 31 drives a shutter drive motor 32 and operates the shutter unit 33 according to the control signal outputted from the body microcomputer 10 upon receipt of the timing signal. The shutter drive motor 32 is preferably a motor that is separate and independent from the motor (not shown) used to flip up the quick return mirror 23 to outside the optical axis AZ, but there is no problem if one motor performs both tasks.

As shown in FIG. 2, in the still picture photography mode, the body microcomputer 10 that has received a timing signal after operation of the release button 30 outputs a control signal to a strobe controller 47. The strobe controller 47 turns on a strobe 48, constituted by an LED or the like, on the basis of the control signal. The strobe 48 is controlled according to the amount of light received by the imaging sensor 11. Specifically, the strobe controller 47 automatically turns on the light in conjunction with shutter operation when the output of the image signal from the imaging sensor 11 is at or below a specific value. On the other hand, if the image signal output is over the specific value, the strobe controller 47 controls the strobe 48 so that no light is emitted.

A strobe switch 49 is a control member for setting the operation of the strobe 48 regardless of the output of the above-mentioned imaging sensor 11. Specifically, the strobe controller 47 turns on the strobe 48 when the strobe switch 49 is "on," and turns off the strobe 48 when the switch is "off."

In the moving picture photography mode, the release button 30 or the moving picture photography button 35 is operated, and the strobe 48 (constituted by an LED or the like) functions as a video light, so that light is shined toward the subject during moving picture photography.

The image signal (still picture or moving picture) outputted from the imaging sensor 11 is sent to and processed by an analog signal processor 13, an A/D converter 14, a digital signal processor 15, a buffer memory 16, and an image compressor 17, in that order. The analog signal processor 13 subjects the image signal outputted by the imaging sensor 11 to analog signal processing, such as gamma processing. The A/D converter 14 converts the analog signal outputted from the analog signal processor 13 into a digital signal. The digital signal processor 15 subjects the image signal converted into a digital signal by the A/D converter 14 to digital signal processing, such as noise elimination or contour enhancement. The buffer memory 16 is a RAM, which temporarily stores image signals.

The image signal stored in the buffer memory 16 is sent to and processed by the image compressor 17 and an image recorder 18, in that order. The image signal stored in the buffer memory 16 is read at a command from an image recording controller 19, and sent to the image compressor 17. Data for the image signal sent to the image compressor 17 is compressed into an image signal according to a command from the image recording controller 19. The image signal is compressed by this compression processing to a data size that is smaller than that of the original data. The compression method can be, for example, JPEG (Joint Photographic Experts Group) in the case of a still picture. In the case of a moving picture, MPEG (Moving Picture Experts Group) is used. Also, an H.264/AVC format in which a plurality of frames of image signals are compressed together can be used. The compressed image signal is recorded to the image recorder 18 by the image recording controller 19.

The image recorder 18 is an internal memory or a removable memory, for example, that records while referencing specific information to be recorded with the image signal on the basis of a command from the image recording controller 19. The specific information to be recorded along with the image signal includes the date and time the image was captured, focal length information, shutter speed information, aperture value information, and photography mode information. The format for this information includes the Exif (registered trademark) format and formats similar to the Exif (registered trademark) format. The moving picture file may be, for example, an H.264/AVC format or a format similar to an H.264/AVC format.

The display unit 20 is a liquid crystal monitor, for example, and displays as a visible image the image signal recorded to the image recorder 18 or the buffer memory 16 based on a command from an image display controller 21. The display modes of the display unit 20 are a display mode in which just the image signal is displayed as a visible image, and a display mode in which the image signal and information from the time of capture are displayed as a visible image. The display unit 20 is a variable-angle monitor with which the angle can be freely changed with respect to the case 3a of the camera body 3, and the angle can be tilted upward by means of a hinge mechanism 112. More specifically, the display unit 20 can be in a closed state in which it is disposed parallel to the rear face of the case 3a, or an open state in which it is disposed at a tilt so as to face upward with respect to the rear face of the case 3a.

A pin 110 is fixed to the display unit 20 for detecting whether it is open or closed. To detect the pin 110, an open/closed detection sensor 111 (an example of a detector) is provided to the camera body 3. The open/closed detection sensor 111 is fixed to the case 3a of the camera body 3.

Figure 16:
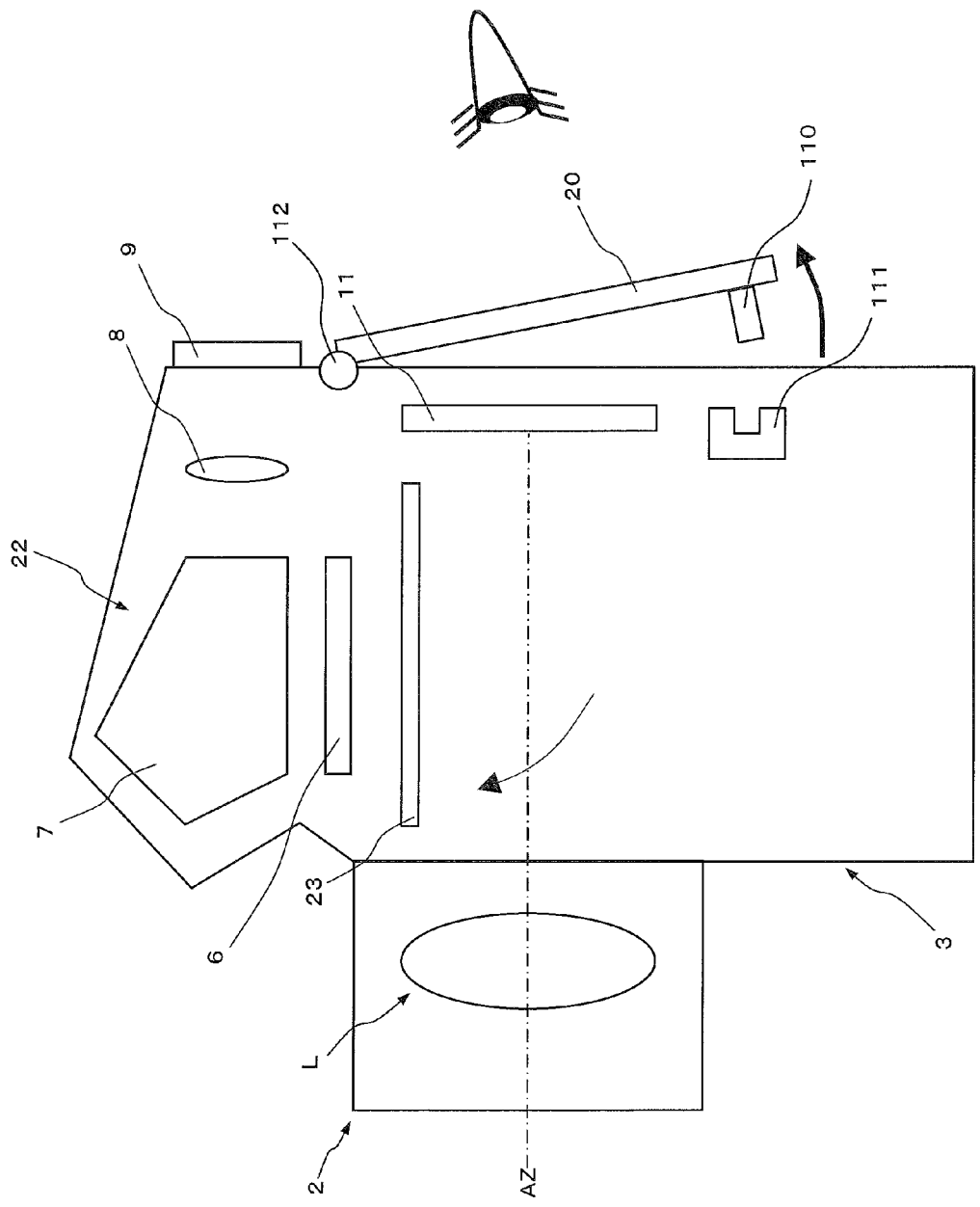
FIG. 16 is a diagram illustrating the monitor photography mode when the display unit is used by opening up the camera body.

The body microcomputer 10 determines whether the display unit 20 is open or closed on the basis of a detection signal from the open/closed detection sensor 111 (an example of third control information). For example, as shown in FIG. 1, when the display unit 20 is closed, the pin 110 is disposed within the detection region of the open/closed detection sensor 111, so if the pin 110 is detected by the open/closed detection sensor 111, it can be concluded that the display unit 20 is closed. As shown in FIG. 16, when the display unit 20 is open (more precisely, when the display unit 20 is not closed), the pin 110 is not disposed within the detection region of the open/closed detection sensor 111, so if the pin 110 is not detected by the open/closed detection sensor 111, it can be concluded that the display unit 20 is open, and not closed.

Thus, whether the display unit 20 is open or closed can be determined on the basis of the detection signal of the open/closed detection sensor 111. The direction in which the display unit 20 opens is not limited to up and down as in this embodiment, and may be some other direction.

An AV cable connection detecting circuit 97 (an example of a detector) detects that an AV cable 100 used for AV output terminal connection is connected to an AV output terminal 98 (an example of an image output unit). The AV cable connection detecting circuit 97 has, for example, an input terminal connected to the body microcomputer 10, and a switch that grounds this input terminal. In a state in which the power to the camera system 1 is on, the voltage of the input terminal is pulled up to a specific drive voltage. When the pin jack of the AV cable 100 is inserted, for example, into the AV output terminal 98, the grounding switch changes to a closed state. As a result, the voltage level of the input terminal is inverted from a high level to a low level. The connection of the AV cable 100 can be detected by monitoring the change in the voltage level of the input terminal (an example of second control information). For instance, monitoring of the voltage level of the input terminal is carried out by the body microcomputer 10. The body microcomputer 10 here can be considered an example of a detector.

When the AV cable 100 is connected to the AV output terminal 98, the NTSC signal produced by a video signal output circuit 99 is outputted through the AV output terminal 98 and the AV cable 100 to an external monitor 101 connected to the AV cable 100. This allows a real-time image or an image that has been recorded to be displayed on the external monitor 101.

The AV cable 100 is not limited to being a cable that transmits NTSC signals, and may be an interface cable that transmits control signals at the same time, such as a USB (Universal Serial Bus) cable.

The camera system 1 has a self-timer function. More specifically, as shown in FIG. 2, the camera body 3 is provided with a self-timer function setting button 95 (an example of a detector) for switching to self-timer photography mode. Information about the operation of the self-timer function setting button 95 (an example of fourth control information) is sent to the body microcomputer 10. In self-timer photography mode, a still picture is captured after a specific amount of time has elapsed since the release button 30 of the camera body 3 or a remote control (not shown) was pressed. In the self-timer photography mode, it is possible to set, for example, the time from the issuance of a photography command until the first image is captured (waiting time), the number of continuous images captured, and the interval between image captures.

As shown in FIG. 1, the quick return mirror 23 is constituted by a main mirror 23a capable of reflecting and transmitting incident light, and a sub-mirror 23b that is provided on the rear face side of the main mirror 23a and reflects light transmitted by the main mirror 23a. The quick return mirror 23 is rotatably supported by the case 3a, and can be in a first position disposed in the optical path, or a second position that is retracted out of the optical path. A quick return mirror controller 36 is able to drive the quick return mirror 23 to these two positions.

In a state in which the quick return mirror 23 is disposed within the optical path, incident light is split into two beams by the main mirror 23a, and the reflected beam is guided to the viewfinder optical system 22. The transmitted beam is reflected by the sub-mirror 23b and utilized as an AF light beam by the focal point detection unit 5. During ordinary photography, the quick return mirror 23 is flipped up outside the optical axis AZ by the quick return mirror controller 36, the shutter unit 33 is opened, and a subject image is formed on the imaging face of the imaging sensor 11. When photography is not being performed, as shown in FIG. 1, the quick return mirror 23 is disposed along the optical axis AZ, and the shutter unit 33 is closed.

The viewfinder optical system 22 is constituted by a viewfinder screen 6 on which a subject image is formed, a pentaprism 7 that converts the subject image into an erect image, an eyepiece lens 8 that guides the erect image of the subject to a viewfinder eyepiece window 9, and the viewfinder eyepiece window 9 that is used by the user to view the subject image.

1.2: Interchangeable Lens Unit

As shown in FIG. 1, the interchangeable lens unit 2 mainly includes an imaging optical system L for forming an optical image of a subject on the imaging sensor 11 in the camera system 1, a focus lens group drive controller 41 that performs focusing by driving a second lens group L2 (focus lens group) in the optical axis direction, an aperture drive controller 42 for adjusting the aperture, and the lens microcomputer 40 for controlling the operation of the interchangeable lens unit 2. The second lens group L2 is an example of a focal point adjuster, the focus lens group drive controller 41 is an example of a lens controller, and the lens microcomputer 40 is an example of a lens controller.

The focus lens group drive controller 41 mainly controls the drive of the second lens group L2 (focus lens group; discussed below) that adjusts the focus. The aperture drive controller 42 mainly controls the drive of an aperture unit 43 for adjusting how open or closed the aperture is.

The lens microcomputer 40 is the main control apparatus for the interchangeable lens unit 2, and is connected to the various components installed in the interchangeable lens unit 2. More specifically, a CPU, ROM, and RAM are installed in the lens microcomputer 40, and the CPU reads the programs loaded in the ROM, which allows the lens microcomputer 40 to carry out its various functions. Also, the body microcomputer 10 and the lens microcomputer 40 are connected by electrical contacts (not shown) provided to the lens mount 79, allowing information to be exchanged between the two.

Various information (lens information) related to the interchangeable lens unit 2 is stored in a memory 44 of the lens microcomputer 40. More specifically, focal length information indicating the maximum and minimum values for focal length of the interchangeable lens unit 2 (focal length variable range), or the object point distance, etc., is stored. The various information stored in the memory 44 is sent to the camera body 3 side when the interchangeable lens unit 2 is attached to the camera body 3 so that it can be used during photography. Information related to whether or not the interchangeable lens unit 2 is compatible with the above-mentioned moving picture photography is also stored in the memory 44. The information related to moving picture photography will be discussed in detail below.

Figure 4:
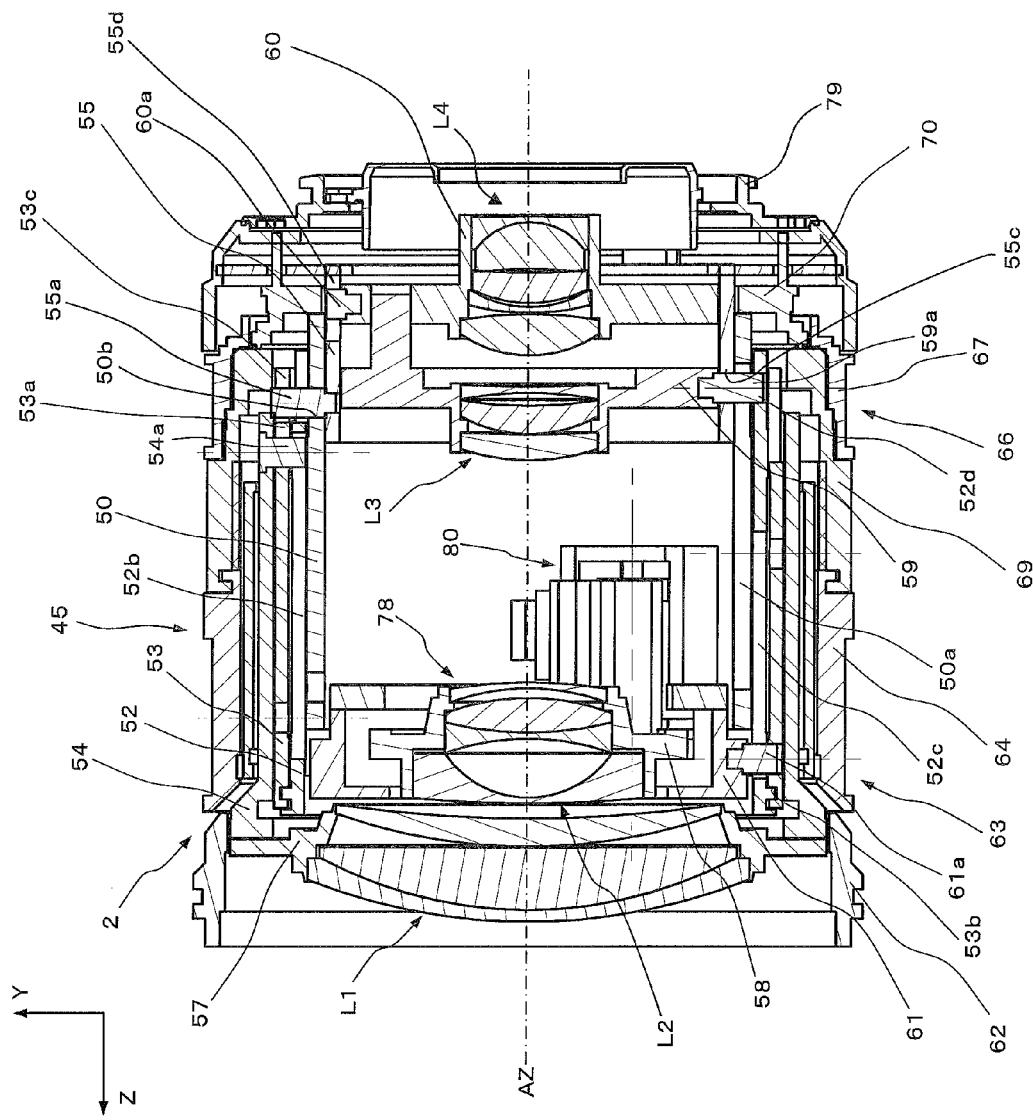
FIG. 4 is a cross section at the wide angle end of an interchangeable lens unit.

The specific configuration of the interchangeable lens unit 2 will be described through reference to FIGS. 4 to 7. As shown in FIG. 4, an XYZ three-dimensional coordinate system is set up in which the direction along the optical axis AZ of the interchangeable lens unit 2 serves as the Z axis direction (the subject side is the positive side, and the camera body 3 side is the negative side). The imaging optical system L, which has four lens groups, is installed in the interchangeable lens unit 2. More specifically, the interchangeable lens unit 2 has a first lens group L1, a second lens group L2, a third lens group L3, and a fourth lens group L4. The first lens group L1, second lens group L2, third lens group L3, and fourth lens group L4 are able to move along the optical axis AZ in the Z axis direction. The second lens group L2 is the lens group that moves along the optical axis AZ in the Z axis direction to perform focusing.

The interchangeable lens unit 2 has a lens barrel 45 that supports the imaging optical system L. The lens barrel 45 has a fixed frame 50, a first linear frame 52, a first rotary frame 53, a first holder 54, a second rotary frame 55, a first lens support frame 57, a second lens support frame 58, a third lens support frame 59, a fourth lens support frame 60, a second holder 61, a filter mount 62, a zoom ring unit 63, a focus ring unit 66, and a lens mount 79.

The first rotary frame 53 is disposed coaxially on the outer peripheral side of the first linear frame 52, and is supported by the first linear frame 52 so as to be capable of rotating around the optical axis AZ.

The first holder 54 is disposed coaxially on the outer peripheral side of the first rotary frame 53, and its rotation around the optical axis AZ is limited by the first linear frame 52. When the first rotary frame 53 rotates around the optical axis AZ, the first holder 54 moves in the Z axis direction without rotating with respect to the first linear frame 52 (while rotating with respect to the first rotary frame 53). Three cam pins 54a disposed at a constant pitch in the circumferential direction are provided to the portion of the first holder 54 on the negative side in the Z axis direction.

The second holder 61 is disposed coaxially on the inner peripheral side of the first linear frame 52, and its rotation around the optical axis AZ is limited by the first linear frame 52. The second holder 61 has three cam pins 61a disposed at a constant pitch in the circumferential direction. The cam pins 61a are inserted into through-linear grooves 52c of the first linear frame 52 and cam though-grooves 53b of the first rotary frame 53. Therefore, when the first rotary frame 53 rotates around the optical axis AZ, the second holder 61 moves in the Z axis direction without rotating with respect to the first linear frame 52 (while rotating with respect to the first rotary frame 53).

The first linear frame 52 is disposed coaxially on the outer peripheral side of the fixed frame 50, and is supported by the fixed frame 50, the second rotary frame 55, and the third lens support frame 59. The rotation of the first linear frame 52 around the optical axis AZ is limited by the fixed frame 50. When the first rotary frame 53 rotates around the optical axis AZ, the first linear frame 52 moves in the Z axis direction without rotating with respect to the fixed frame 50. The second rotary frame 55 is disposed coaxially on the inner peripheral side of the fixed frame 50, and is supported by the fixed frame 50. When the first rotary frame 53 rotates around the optical axis AZ, the second rotary frame 55 moves along the optical axis AZ while rotating around the optical axis AZ with respect to the fixed frame 50.

The third lens support frame 59 is disposed coaxially on the inner peripheral side of the second rotary frame 55, and its rotation around the optical axis AZ is limited by the fixed frame 50. When the first rotary frame 53 rotates around the optical axis AZ, the third lens support frame 59 moves in the Z axis direction without rotating with respect to the fixed frame 50.

The fourth lens support frame 60 is disposed coaxially on the inner peripheral side of the second rotary frame 55, and its rotation around the optical axis AZ is limited by the third lens support frame 59. When the first rotary frame 53 rotates around the optical axis AZ, the fourth lens support frame 60 moves along the optical axis AZ without rotating with respect to the third lens support frame 59.

The first lens support frame 57 is fixed to the end of the first holder 54, and supports the first lens group L1. The second lens support frame 58 supports the second lens group L2. An ultrasonic actuator unit 80 (discussed below) and an anti-rotation part (not shown) disposed at a substantially opposite position on the circumference thereof are provided to the second lens support frame 58.

The third lens support frame 59 supports the third lens group L3 and has three cam pins 59a disposed at a constant pitch in the circumferential direction.

The fourth lens support frame 60 supports the fourth lens group L4 and has three cam pins 60a disposed at a constant pitch in the circumferential direction.

The first rotary frame 53 is a cam ring that is cylindrical in shape, and has three cam though-grooves 53a and three cam though-grooves 53b that are tilted with respect to the optical axis AZ. The cam pins 54a of the first holder 54 are inserted into the cam though-grooves 53a. The cam pins 61a of the second holder 61 are inserted into the cam though-grooves 53b. Three slots 53c into which the cam pins 55a of the second rotary frame 55 are inserted are provided to the end of the first rotary frame 53. The cam pins 55a include one long pin and two short pins, and only the long pin is inserted into the slots 53c.

The first linear frame 52 is a cam ring that is cylindrical in shape, and has three cam though-grooves 52b into which the cam pins 54a of the first holder 54 are inserted. Three linear through-grooves 52c into which the cam pins 61a of the second holder 61 are inserted are formed at positions where they will not interfere with the cam though-grooves 52b. Through-holes 52d into which the cam pins 59a provided to the third lens support frame 59 are inserted are provided to the end of the first linear frame 52 to allow integral movement with the third lens support frame 59 in the Z axis direction.

Three linear through-grooves 50a for moving the first linear frame 52 in the Z axis direction are formed in the fixed frame 50. Three cam though-grooves 50b that are tilted with respect to the Z axis direction are formed at a constant pitch in the circumferential direction, at a portion where there is no interference with the linear through-grooves 50a, in order to move the second rotary frame 55 in a direction along the optical axis AZ.

Three cam through-grooves 55c that are tilted with respect to the Z axis direction and engage with the cam pins 59a of the third lens support frame 59 are formed at a constant pitch in the circumferential direction on the outer peripheral face of the second rotary frame 55. Three cam through-grooves 55d that are tilted with respect to the Z axis direction and engage with the cam pins 60a of the fourth lens support frame 60 are formed at a constant pitch in the circumferential direction.

The filter mount 62 is cylindrical in shape, and a polarizing filter, protective filter, or other such optical filter and female threads for attaching a conversion lens are formed on the Z axis direction positive side (subject side). The filter mount 62 is fixed to the first holder 54 by three attachment screws, etc.

The zoom ring unit 63 has a zoom ring 64 and a first angle detector 65 (FIG. 1) that detects the rotational angle of the zoom ring 64. The zoom ring 64 is cylindrical in shape, and is supported rotatably around the optical axis AZ, while restricted in the direction along the optical axis AZ with respect to a ring base 69 fixed to the fixed frame 50. A concave part (not shown) that is restricted only around the optical axis AZ and is not restricted in the direction along the optical axis AZ is formed on the inner peripheral part of the zoom ring 64. This concave part engages with a convex component (not shown) provided to the outer peripheral part of the first rotary frame 53. Thus, the zoom ring 64 rotates integrally with the first holder 54. Also, the first angle detector 65 detects the rotational angle and rotation direction of the zoom ring 64, and transmits focal length information to the lens microcomputer 40. The focal length of the imaging optical system L is displayed on the outer peripheral face of the zoom ring 64. The absolute positions of the lens groups L1 to L4 can be detected by a detecting sensor (not shown) that is linked to the rotational angle of the zoom ring 64.

The focus ring unit 66 has a focus ring 67 and a second angle detector 68 (FIG. 1) that detects the rotational angle of the focus ring 67. The focus ring 67 is cylindrical in shape, and is supported rotatably around the optical axis AZ, while restricted in the direction along the optical axis AZ with respect to a ring base 69 fixed to the fixed frame 50. Also, the rotational angle and rotation direction of the focus ring 67 can be detected by the second angle detector 68. This second angle detector 68 detects, for example, whether or not protrusions formed at regular intervals in the Z axis direction all the way around the focus ring 67 have passed between the light emitting part and the light receiving part that are the constituent portions of two photosensors (not shown), and thereby detects the rotational angle and rotation direction of the focus ring 67. The second angle detector 68 detects the rotational angle and rotation direction of the focus ring 67 set by the user, and transmits object point distance information to the lens microcomputer 40.

The lens mount 79 has a lens mount contact (not shown), and signals are transmitted back and forth between the lens microcomputer 40 and the body microcomputer 10 via a lens mount contact (not shown) of the body mount 4. Also, the lens mount 79 is fixed to the fixed frame 50 via the mount base 70.

Figure 6:
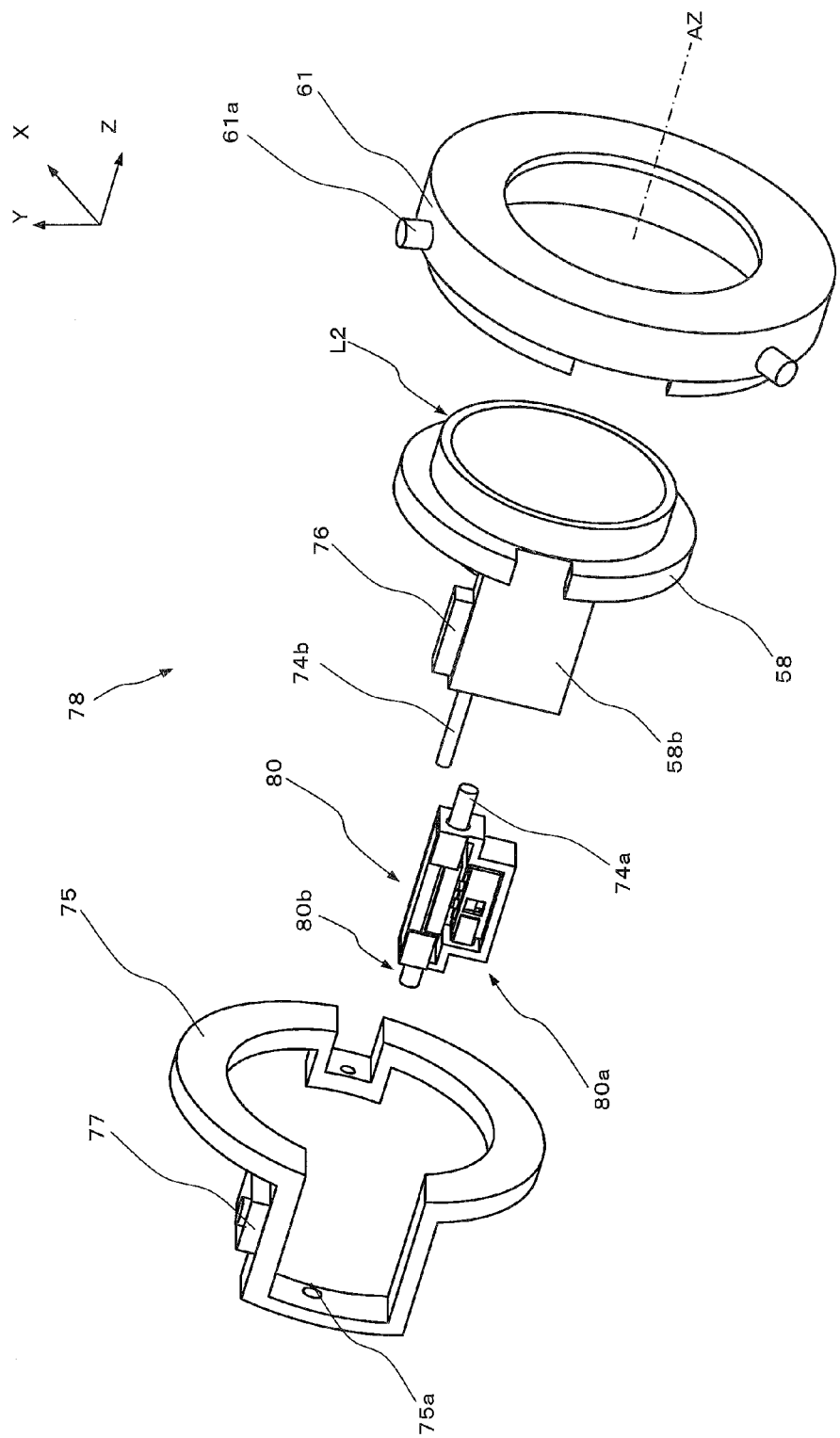
FIG. 6 is an exploded oblique view of the configuration of a focus lens unit.
Figure 7:
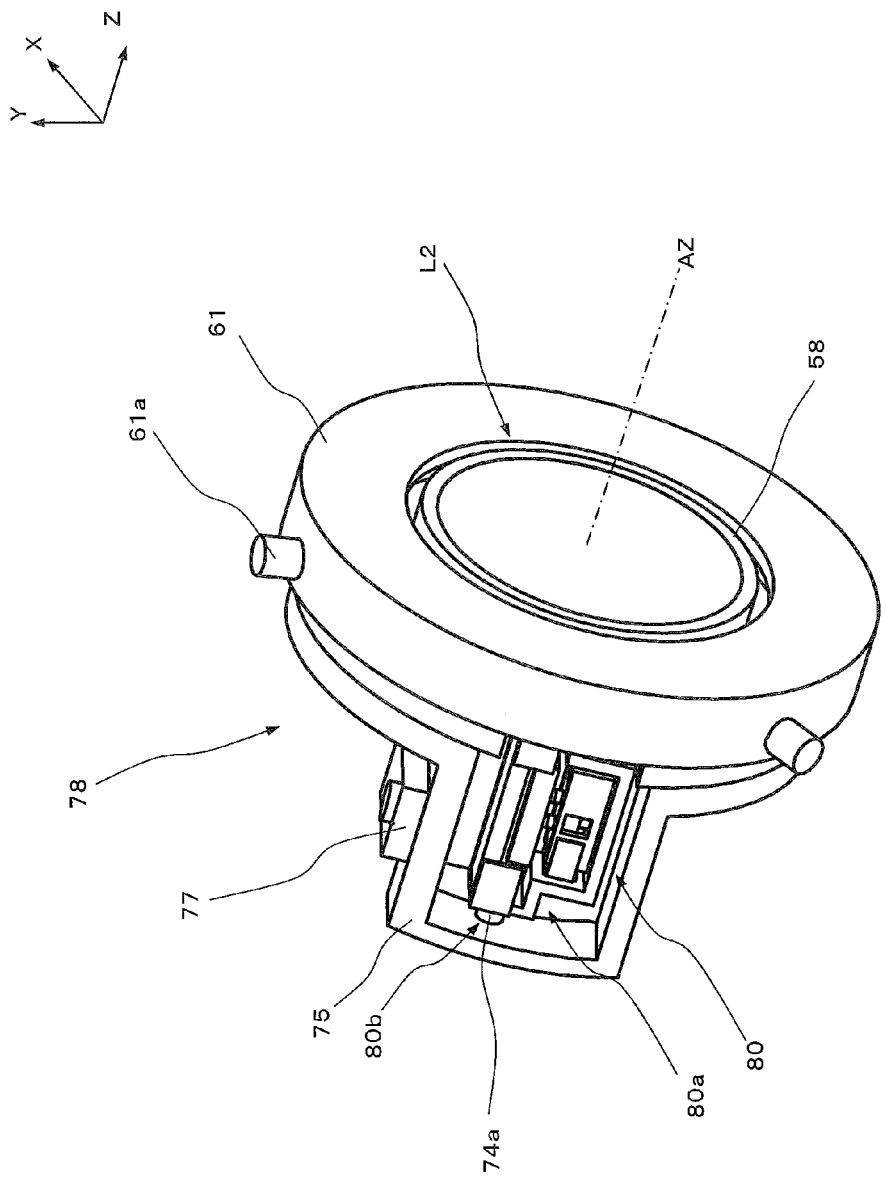
FIG. 7 is an assembled oblique view of the configuration of a focus lens unit.

As shown in FIGS. 6 and 7, a focus lens unit 78 that can move in a direction along the optical axis AZ as the focusing proceeds has the second lens group L2, the second lens support frame 58, the second holder 61, guide poles 74a and 74b, a two-group fixing frame 75, the ultrasonic actuator unit 80, a magnetic scale 76, and a magnetic sensor 77. The second lens support frame 58 supports the second lens group L2 (focus lens group). The ends of the guide pole 74a are included in the ultrasonic actuator unit 80 and fixed to the two-group fixing frame 75 and the second holder 61. The guide pole 74b extends in the Z axis direction from a fixing portion 58b of the second lens support frame 58, and is inserted into a hole 75a in the two-group fixing frame 75. The second lens support frame 58 is supported movably in the Z axis direction by the two-group fixing frame 75. The second lens support frame 58 is driven in the Z axis direction by the ultrasonic actuator unit 80.

The ultrasonic actuator unit 80 has a movable part 80a and a fixed part 80b. The movable part 80a is fixed with screws or the like to the fixing portion 58b of the second lens support frame 58. When a specific current is sent to the ultrasonic actuator unit 80, the movable part 80a moves in the Z axis direction with respect to the fixed part 80b, and the second lens support frame 58 is driven in the Z axis direction as a result.

The magnetic scale 76 and magnetic sensor 77 constitute a position detecting unit that detects the position of the second lens support frame 58 with respect to the two-group fixing frame 75. The magnetic scale 76 is fixed to the second lens support frame 58 and is magnetized at regular intervals in the Z axis direction. The magnetic sensor 77 is an MR sensor or the like that detects signals from the magnetic scale 76, and is fixed to the two-group fixing frame 75. A specific spacing is maintained between the magnetic sensor 77 and the magnetic scale 76. Performing position detection and feedback control with the magnetic sensor 77 affords a linear actuator that has high-speed response as well as high resolution, high accuracy, quiet operation, and high torque. Consequently, focus characteristics that are ideal for moving picture photography can be obtained. Furthermore, the home position of the second lens group L2, that is, the second lens support frame 58, can be detected with a photosensor or the like (not shown). Thus detecting the home position makes it possible to detect the absolute position of the second lens group L2 with respect to the lens mount 79. Also, as to the relative position from the home position, if the output value from the magnetic sensor 77 is counted, where the second lens group L2 is located can always be detected. In other words, it is always possible to detect the current position of the second lens group L2, using the lens mount 79 as a reference, by detecting the relative position away from the home position.

Figure 8:
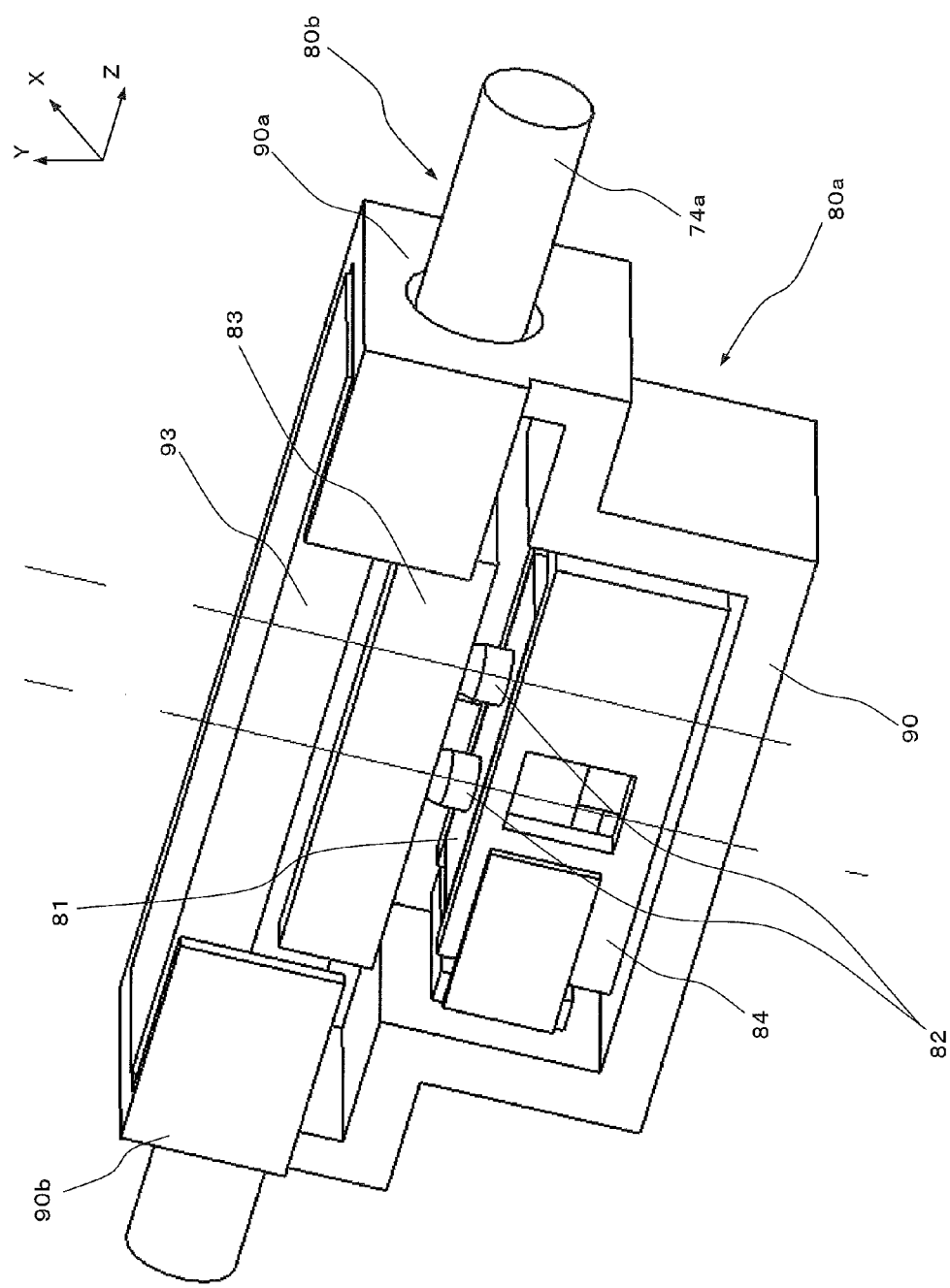
FIG. 8 is an oblique view of an ultrasonic actuator unit.
Figure 9:
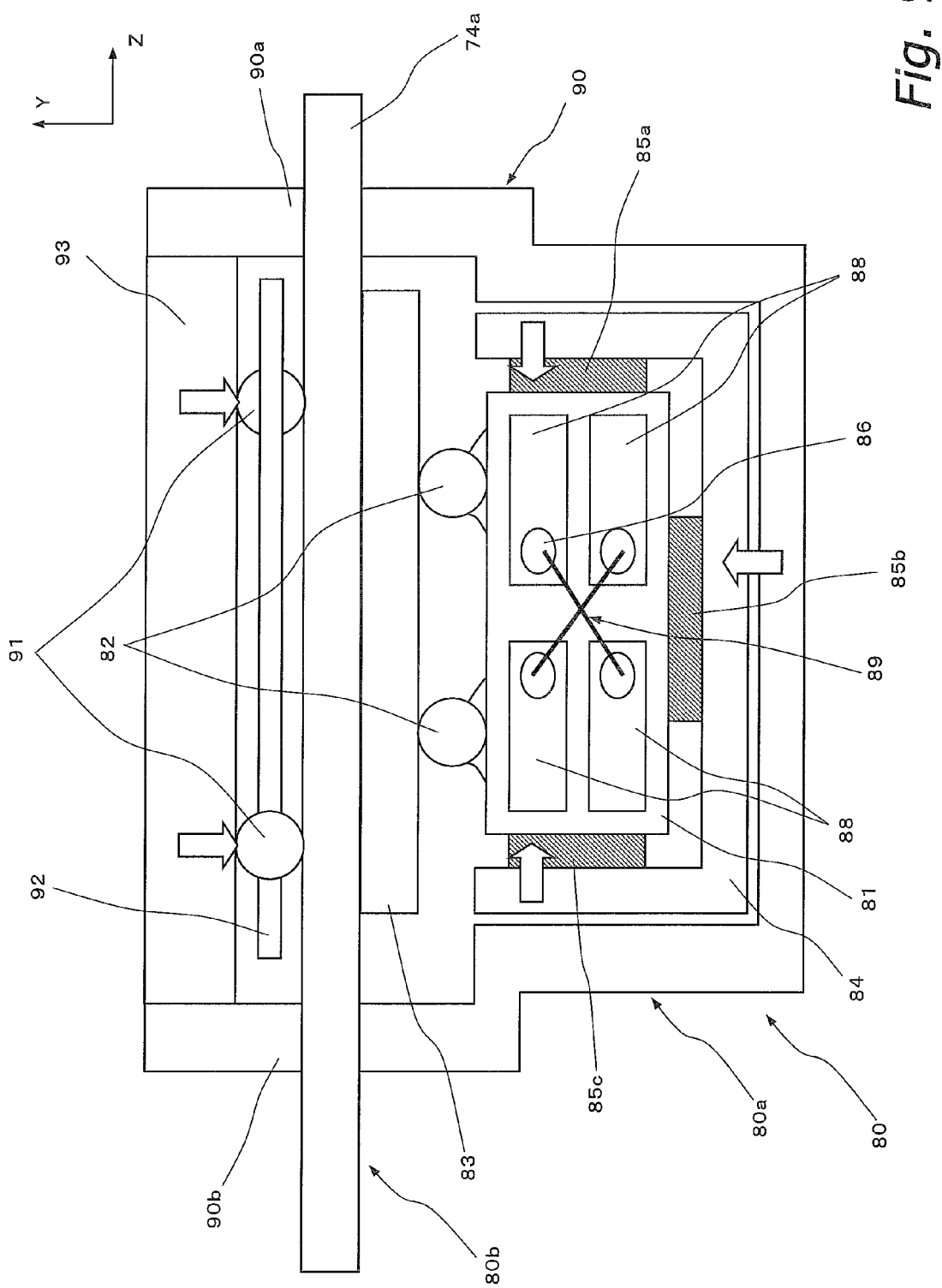
FIG. 9 is a simplified diagram of an ultrasonic actuator unit.

Next, the ultrasonic actuator unit 80 will be described through reference to FIGS. 8 and 9. FIG. 8 is an oblique view of the ultrasonic actuator unit. FIG. 9 is a cross section of the ultrasonic actuator unit.

As shown in FIGS. 8 and 9, in the ultrasonic actuator unit 80, substantially spherical drivers 82 are provided at two places on the surface of a piezoelectric element 81 composed of PZT, quartz crystal, or another such piezoelectric material. These two places correspond to the approximate center of the antinode of flexural vibration of the piezoelectric element 81, and the vibration of the piezoelectric element 81 can be more effectively utilized by providing the drivers 82 at these locations.

Examples of the material of the drivers 82 include zirconia, alumina, silicon nitride, silicon carbide, and tungsten carbide. The shape of the drivers 82 is substantially spherical, and using a substantially spherical shape reduces the contact surface area of the piezoelectric element 81 in the lengthwise direction. Consequently, there is less impairment of the flexural vibration of the piezoelectric element 81, and as a result its efficiency as an ultrasonic actuator can be improved.

A power supply electrode 88 that is divided in four is provided to the front face of the piezoelectric element 81, and these power supply electrodes 88 are connected to wires 89 by solder 86. The wires 89 are guided to the outside through holes (not shown) provided to an inner case 84. When voltage is supplied through these wires 89 to the power supply electrodes 88 of the piezoelectric element 81, the piezoelectric element 81 vibrates according to the frequency of the voltage. The portion of the piezoelectric element 81 where the solder 86 is formed is the node periphery of stretching vibration and flexural vibration. If this node is used as the site where the wires 89 are connected, this will reduce the adverse effect on the vibration of the piezoelectric element 81, that is, the unnecessary load on the piezoelectric element 81 caused by forming the solder 86.

The ultrasonic actuator unit 80 mainly has the movable part 80a and the fixed part 80b. The movable part 80a has the piezoelectric element 81, the drivers 82, the inner case 84, an outer case 90, guide balls 91, a retainer 92, and an outer case cover 93. The fixed part 80b has a moving body 83, a diaphragm 94, and the guide pole 74a.

The drivers 82 support the moving body 83, and the drivers 82 undergo substantially elliptical motion under the vibration of the piezoelectric element 81, which causes the drivers 82 to move reciprocally in the Z axis direction with respect to the moving body 83. Specifically, the stretching vibration direction of the piezoelectric element 81 is the same as the direction in which the moving body 83 is able to move. Also, the flexural vibration direction is perpendicular to the movable direction with respect to the moving body 83, and is a direction that links the piezoelectric element 81 and the moving body 83 (that is, the direction in which the drivers 82 support the moving body 83).

Alumina is an example of the material of the moving body 83. If alumina is used for the drivers 82, then from the standpoint of wear, the alumina of the moving body 83 is preferably softer than the alumina of the drivers 82.

The piezoelectric element 81 is housed in the inner case 84, and the piezoelectric element 81 is supported by a support 85 provided inside the inner case 84. The support 85 is made from electroconductive silicone rubber, for example. Specifically, the piezoelectric element 81 is disposed in the inner case 84 so that the stretching direction of the piezoelectric element 81 is the same as the direction in which the moving body 83 is able to move (the Z axis direction, a direction along the optical axis AZ). Side wall supports 85a and 85c are provided to the inner side walls of the inner case 84 in the same direction as the direction in which the moving body 83 is able to move, and side pressure is exerted on the inner side walls. A rear face support 85b is provided to the inner bottom face of the inner case 84, which supports the piezoelectric element 81 and thereby exerts a pressing force. The rear face support 85b is provided so that the two drivers 82 here support the moving body 83 at substantially the same pressure, and this allows the moving body 83 to be operated stably.

The inner case 84 is fixed inside the outer case 90. The guide pole 74a, which is cylindrical in shape, is disposed at the upper part of the moving body 83. The guide balls 91 supported by the retainer 92 are provided at two places above the guide pole 74a. The outer case cover 93 is provided at the upper part of the guide balls 91. The guide balls 91 are sandwiched between the outer case cover 93 and the guide pole 74a. Accordingly, a pressing force is exerted on the guide pole 74a via the guide balls 91. Consequently, the guide pole 74a and the moving body 83 are pressed together and fixed at a specific pressure.

Bearings 90a and 90b that support the guide pole 74a are provided to the ends of the outer case 90, and the outer case 90 is able to move in the Z axis direction with respect to the guide pole 74a. That is, when the drivers 82 move elliptically, this allows the movable part 80a to move reciprocally in a direction along the optical axis AZ with respect to the fixed part 80b including the guide pole 74a and the moving body 83.

The operation of the ultrasonic actuator unit 80 constituted as above will now be described. When AC voltage of a specific frequency is applied to a specific power electrode of the piezoelectric element 81, a secondary mode of flexural vibration and a primary mode of stretching vibration are induced in the piezoelectric element 81. The resonance frequency of the flexural vibration and the resonance frequency of the stretching vibration are determined by the material, shape, and so forth of the piezoelectric element, and if these two frequencies are substantially matched, and voltage with a frequency that is close to these is applied, a flexural secondary mode and a stretching primary mode will be harmonically induced in the piezoelectric element 81. As a result, the drivers 82 provided to the piezoelectric element 81 undergo elliptical motion as viewed in the direction of the drawing plane. Specifically, the combination of the flexural vibration and stretching vibration of the piezoelectric element 81 brings about elliptical motion in the drivers 82. Because of this elliptical motion, the movable part 80a constituted by the drivers 82, etc., can move reciprocally in the Z axis direction with respect to the moving body 83, and moves integrally with the second lens group L2.

Thus slidably supporting the focus lens group with the two guide poles differs from drive by a conventional rotary cam mechanism in that there is no backlash or hysteresis, and wobbling (minute reciprocal vibrations) is possible in a direction along the optical axis AZ, so the focus lens group drive can be controlled so that a focused state is always maintained, by contrast detection using the imaging sensor 11. This means that moving picture photography is possible even with a digital single lens reflex camera.

1.3: Lens Information Related to Interchangeable Lens Unit

Information related to the interchangeable lens unit 2 will now be described. Various kinds of information related to the interchangeable lens unit 2 (lens information) is stored in the memory 44 of the lens microcomputer 40. More specifically, focal length information indicating the maximum and minimum values for focal length of the interchangeable lens unit 2 (focal length variable range), or the object point distance, etc., is stored in the memory 44.

The memory 44 also holds information related to whether or not the interchangeable lens unit 2 is compatible with the above-mentioned moving picture photography. This information is recorded to a specific address in the memory 44 (such as an extra address that is not normally used).

One possible criterion for determining whether or not the interchangeable lens unit 2 is compatible with moving picture photography is whether or not the second lens group L2 (a focus lens group) is capable of wobbling (such as minute reciprocal vibration based on a triangular wave, a sine wave, or another such input signal). If the constitution is such that the second lens group L2 is supported by guide poles and the second lens group L2 is driven directly by an ultrasonic actuator or the like, it can be determined that wobbling is possible. Therefore, information related to how the second lens group L2 is driven may be used as information related to whether or not the interchangeable lens unit 2 is compatible with moving picture photography.

Furthermore, a constitution in which the amount of magnification change in the image on the imaging sensor 11 is at or below a specific value when the second lens group L2 is wobbled by a specific amount can be the criterion for determining whether or not there is compatibility with moving picture photography. Accordingly, information such as this may be used as information related to whether or not the interchangeable lens unit 2 is compatible with moving picture photography.

Compatibility with moving picture photography can sometimes be determined from the fact that the interchangeable lens unit 2 is compatible with a contrast detection method. Therefore, information as to whether or not there is compatibility with a contrast detection method may be used as information related to whether or not the interchangeable lens unit 2 is compatible with moving picture photography.

If information such as the above is stored in the interchangeable lens unit 2, then when it is attached to the camera body 3, the determination unit of the body microcomputer 10 can determine whether or not moving picture photography is possible on the basis of this information.

Lens information also includes information such as minimum resolution, focusing speed, and so forth that are aspects of the performance of the ultrasonic actuator or other actuator used to drive the focus lens group. The body microcomputer 10 sets the optimum focusing performance according to the combination with the camera body 3. For instance, the frame rate during moving picture photography (30 fps, 60 fps, etc.), the recording pixel count, and so forth are automatically set for the camera system 1 according to this focusing performance. Thus, in combining with a interchangeable lens unit 2 equipped with an ultrasonic actuator, it is even better if the frame rate during moving picture photography can be automatically set to the optimal frame rate that the camera body 3 can attain (60 fps in the case of this embodiment). When the interchangeable lens unit 2 is attached to the camera body 3, lens information is sent from the lens microcomputer 40 to the body microcomputer 10. This allows the body microcomputer 10 to ascertain various information about the interchangeable lens unit 2.

2: Operation of Camera System

The photography operation of the camera system 1 constituted as above will now be described.

Figure 10:
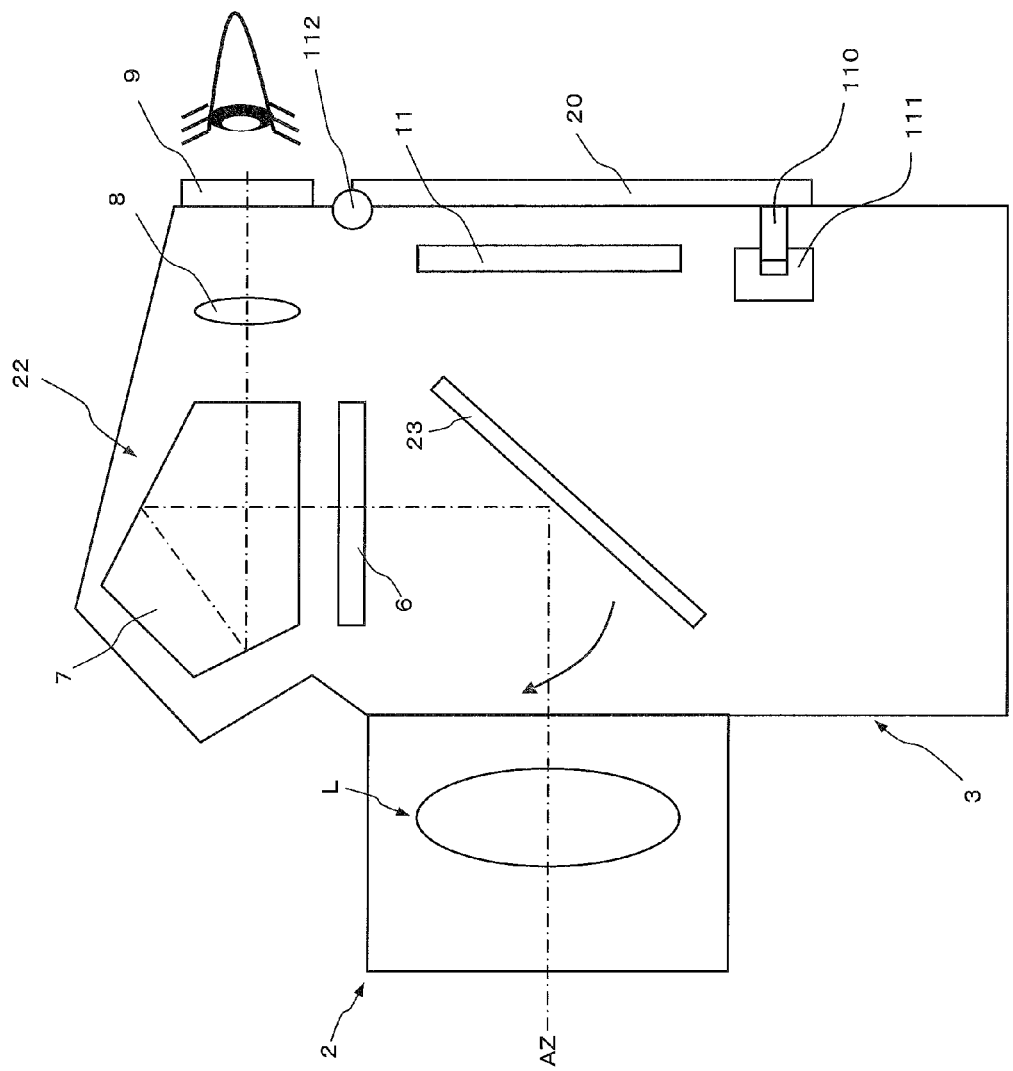
FIG. 10 is a diagram illustrating a viewfinder photography mode.
Figure 11:
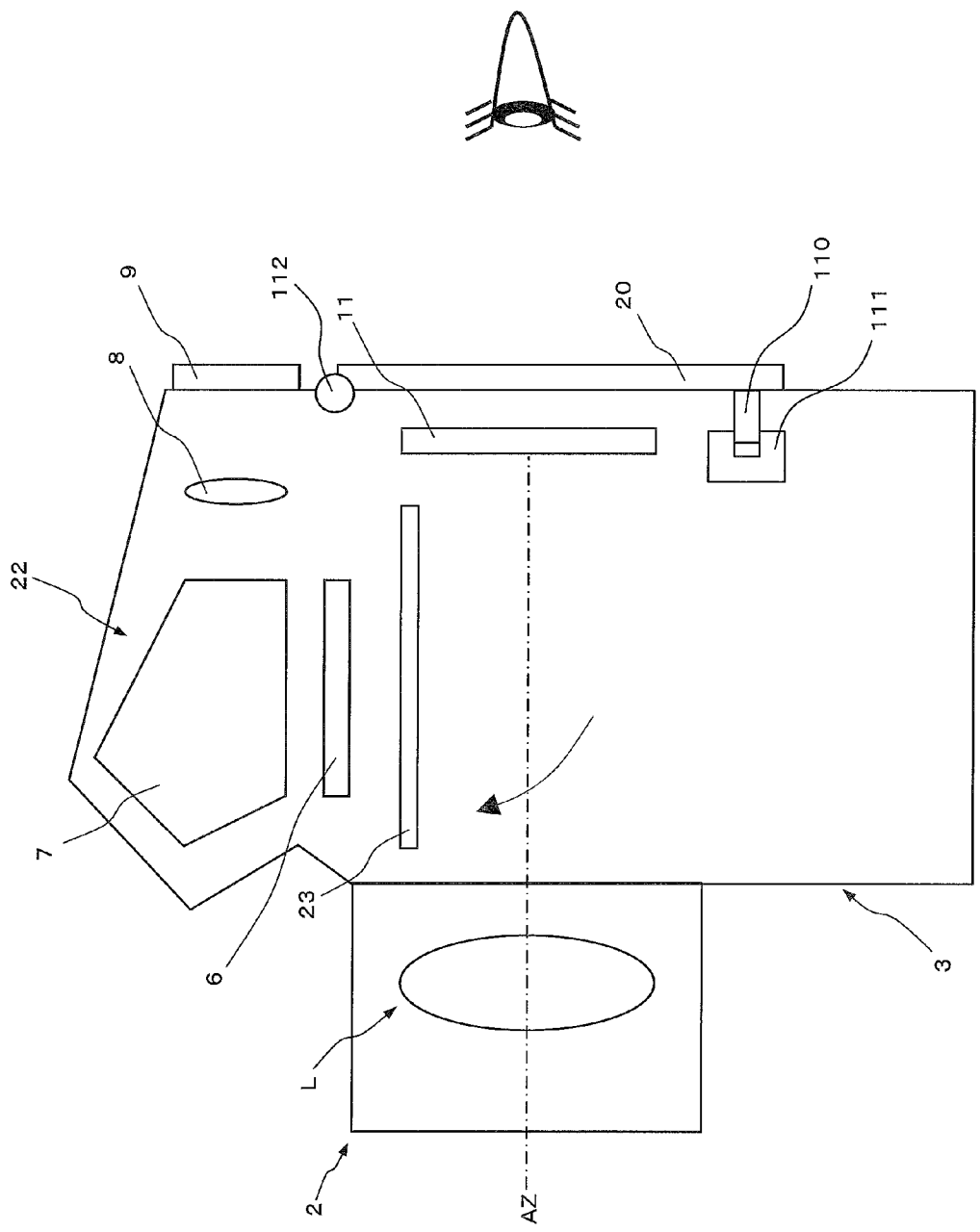
FIG. 11 is a diagram illustrating a monitor photography mode.

FIGS. 10 and 11 are concept diagrams during photography with the camera system 1. FIG. 10 is a diagram illustrating a viewfinder photography mode, and FIG. 11 is a diagram illustrating a monitor photography mode.

2.1: State Prior to Imaging

As shown in FIGS. 10 and 11, light from the subject (not shown) passes through the interchangeable lens unit 2 and is incident on the main mirror 23a, which is a semi-transmitting mirror. Part of the light incident on the case 3a is reflected and incident on the viewfinder screen 6, and the rest of the light is transmitted and incident on the sub-mirror 23b. Light incident on the viewfinder screen 6 forms a subject image. This subject image is converted into an erect image by the pentaprism 7 and incident on an eyepiece lens 8. Consequently, the user can view an erect image of the subject through the viewfinder eyepiece window 9. Light that is incident on the sub-mirror 23b is reflected and incident on the focal point detection unit 5.

2.2: Viewfinder Photography Mode and Monitor Photography Mode

This camera system 1 has two photography modes, namely, a viewfinder photography mode and a monitor photography mode. The viewfinder photography mode is a mode in which the user captures a still picture while looking at the subject through the viewfinder eyepiece window 9. This is the normal photography mode in a conventional single lens reflex camera. The monitor photography mode is a mode in which the user captures a still or moving picture while looking at the subject displayed on the display unit 20, which is a liquid crystal monitor or the like.

In the viewfinder photography mode, as shown in FIG. 10, the quick return mirror 23 is disposed at a specific location along the optical path (more precisely, along the optical axis AZ). The subject light is guided to the viewfinder optical system 22, so the user can view the subject image through the viewfinder eyepiece window 9. When a still picture is to be captured, the quick return mirror 23 is flipped up outside of the optical path, and the shutter unit 33 is opened. As a result, a subject image is formed on the image face of the imaging sensor 11.

Meanwhile, in the monitor photography mode, as shown in FIG. 11, the quick return mirror 23 is retracted out of the optical path. Thus, an image of the subject, what is called a through image, is displayed on the display unit 20 via the imaging sensor 11.

2.3: Operation in Viewfinder Photography Mode

The photography operation of the camera system 1 will be described. The drive sequence in viewfinder photography mode in which the user looks through the viewfinder eyepiece window 9 to capture a still picture will be described through reference to FIGS. 1 to 4.

When an image is to be captured in viewfinder photography mode, the user presses the viewfinder switching button 34 provided to the rear face of the case 3a to select the viewfinder photography mode as the photography mode.

When the user presses the release button 30 halfway down, power is supplied to the body microcomputer 10 and the various units in the camera system 1. The body microcomputer 10 in the camera system 1 that has actuated by the supply of power receives various lens information from the lens microcomputer 40 in the interchangeable lens unit 2, which is similarly actuated by the supply of power, through the lens mount 79 and the body mount 4, and this information is stored in the built-in memory 38. Next, the body microcomputer 10 acquires the amount of defocus (hereinafter referred to as the Df amount) from the focal point detection unit 5, and sends a command to the lens microcomputer 40 to drive the second lens group L2 by this Df amount. The lens microcomputer 40 controls the focus lens group drive controller 41 and operates the second lens group L2 by the Df amount. While focal point detection and drive of the second lens group L2 are thus repeated, the Df amount decreases, and when it reaches a specific amount or less, the body microcomputer 10 that the image is in focus, and drive of the second lens group L2 is stopped.

After this, when the user presses the body microcomputer 10 all the way down, the body microcomputer 10 instructs the lens microcomputer 40 to set the aperture value to the one calculated on the basis of the output from a photometer sensor (not shown). The lens microcomputer 40 then controls the aperture drive controller 42 and stops down the aperture to the indicated aperture value. Simultaneously with this aperture value command, the body microcomputer 10 retracts the quick return mirror 23 to outside the optical path with the quick return mirror controller 36. Once the quick return mirror 23 has been completely retracted, the imaging sensor drive controller 12 directs the image sensor 11 to be driven, and directs the shutter unit 33 to be operated. The imaging sensor drive controller 12 also exposes the image sensor 11 for the time of the shutter speed calculated on the basis of the output from a light metering sensor (not shown).

Upon completion of the exposure, the image data read by the imaging sensor drive controller 12 from the image sensor 11 is subjected to specific image processing, after which it is displayed as a captured image on the display unit 20. The image data that has been read from the image sensor 11 and subjected to the specific image processing is written via the image recorder 18 as image data to a storage medium. Also, upon the completion of exposure, the quick return mirror 23 and the shutter unit 33 are reset to their initial positions. The body microcomputer 10 directs the lens microcomputer 40 to reset the aperture to its open position, and the lens microcomputer 40 issues a reset command to the various units. Upon completion of the resetting, the lens microcomputer 40 conveys the resetting completion to the body microcomputer 10. The body microcomputer 10 awaits the series of processing after exposure and the completion of resetting from the lens microcomputer 40, after which it is confirmed that the release button 30 has not been pressed, and the imaging sequence is ended.

2.4: Operation in Monitor Photography Mode

The drive sequence in monitor photography mode, which the user uses the display unit 20 to capture an image, will now be described through reference to FIGS. 1 to 3B and FIG. 5.

When the display unit 20 is used for imaging, the user operates the viewfinder switching button 34 to select the monitor photography mode. When the monitor photography mode is set, the body microcomputer 10 retracts the quick return mirror 23 to outside the optical path. Consequently, light from the subject reaches the imaging sensor 11. The imaging sensor 11 converts light from the subject that has been imaged on the imaging sensor 11 into image data, and the image data thus acquired can be outputted. The image data read from the imaging sensor 11 by the imaging sensor drive controller 12 undergoes specific image processing, after which it is displayed as a captured image on the display unit 20. Thus displaying the captured image on the display unit 20 allows the user to monitor the subject without having to look through the viewfinder eyepiece window 9.

In this monitor photography mode, contrast-type autofocusing, which is based on image data produced by the imaging sensor 11, is used as the focusing method instead of a phase difference detection method in which the focal point detection unit 5 is used. When a contrast method is used as the method for autofocusing in the monitor photography mode with the display unit 20, precise focusing can be achieved with the camera system. In this monitor photography mode, contrast autofocusing in which image data is used is easier than a conventional phase difference detection method since image data is produced by the imaging sensor 11 in a steady state.

The autofocusing operation by contrast method will now be described.

When performing autofocusing by contrast method, the body microcomputer 10 requests contrast AF-use lens information of the lens microcomputer 40. This contrast AF-use lens information is data that is necessary in autofocusing by contrast method, and includes, for example, the focus drive speed, the amount of focal shift, the zoom ratio, and whether or not contrast autofocus is possible.

The body microcomputer 10 periodically produces a vertical synchronization signal. The body microcomputer 10 produces an exposure synchronization signal in parallel with this on the basis of the vertical synchronization signal. This allows an exposure synchronization signal to be produced because the body microcomputer 10 ascertains ahead of time the exposure start and end timing, using the vertical synchronization signal as a reference. The body microcomputer 10 outputs the vertical synchronization signal to a timing generator (not shown), and outputs the exposure synchronization signal to the lens microcomputer 40. The lens microcomputer 40 synchronizes with the exposure synchronization signal and acquires position information about the second lens group L2.

The imaging sensor drive controller 12 periodically produces an electronic shutter drive signal and the read signal of the imaging sensor 11 on the basis of the vertical synchronization signal. The imaging sensor drive controller 12 drives the imaging sensor 11 on the basis of the electronic shutter drive signal and the read signal. Specifically, the imaging sensor 11 reads to a vertical transmitter (not shown) the image data produced by numerous opto-electrical conversion elements (not shown) present in the imaging sensor 11, according to the read signal.

In still picture photography mode, the user presses the release button 30 half-way down, and the body microcomputer 10 of the camera system 1 receives various kinds of lens information from the lens microcomputer 40 in the interchangeable lens unit 2 via the lens mount 79 and the body mount 4, and this information is stored in the built-in memory 38. Also, the body microcomputer 10 sends an autofocus start command to the lens microcomputer 40. When the release button 30 is pressed down half-way, the autofocus start command is a command to start the autofocusing operation by contrast method. On the basis of this command, the lens microcomputer 40 controls the drive of the second lens group L2 in the direction along the optical axis AZ.

The body microcomputer 10 calculates an evaluation value for use in autofocusing (hereinafter referred to as the AF evaluation value) on the basis of the received image data. More specifically, there is a known method in which a brightness signal is found from the image data produced by the imaging sensor 11, the high-frequency component of the brightness signal on the screen is added up, and the AF evaluation value is found. The calculated AF evaluation value is stored in a DRAM (not shown) in a state of being associated with the exposure synchronization signal. The lens position information acquired from the lens microcomputer 40 is also associated with the exposure synchronization signal. Accordingly, the body microcomputer 10 can stored the AF evaluation value in association with lens position information.

Next, the body microcomputer 10 finds the contrast peak on the basis of the AF evaluation value stored in the DRAM, and monitors whether or not the focal point has been selected. More specifically, the position of the second lens group L2 at which the AF evaluation value is at its maximum value is selected as the focal point. This lens drive method is commonly known as the mountain climbing method.

In this state, the camera system 1 displays the image data produced by the imaging sensor 11 as a through-image (what is known as a live view image) on the display unit 20. Since this through-image is displayed on the display unit 20, the user can determine the composition for capturing a still picture while looking at the display unit 20.

After this, when the user presses the release button 30 all the way down, the body microcomputer 10 directs that the aperture value be set to the one calculated on the basis of the output from the light metering sensor (not shown). The lens microcomputer 40 then controls the aperture drive controller 42 and stops down the aperture until the indicated aperture value is reached. The imaging sensor drive controller 12 directs that the imaging sensor 11 be driven, and directs that the shutter unit 33 be operated. The imaging sensor drive controller 12 also exposes the imaging sensor 11 for the length of time of the specific shutter speed calculated from the output of the imaging sensor 11.

Upon completion of the exposure, the image data read from the imaging sensor 11 by the imaging sensor drive controller 12 is subjected to specific image processing, after which it is displayed as a captured imaged on the display unit 20. Also, the image data read from the imaging sensor 11 and subjected to the specific image processing is written via the image recorder 18 as image data to a storage medium. Also, upon completion of exposure, the quick return mirror 23 is positioned in a state of being retracted out of the optical path, so the user can use the monitor photography mode to view the subject as a captured image on the display unit 20.

When the monitor photography mode is to be exited, the user presses the viewfinder switching button 34, and the system changes to the viewfinder photography mode in which the subject is viewed through the viewfinder eyepiece window 9. When the mode changes to viewfinder photography mode, the quick return mirror 23 is returned to its specific position in the optical path. The quick return mirror 23 is also returned to its specific position in the optical path when the power to the camera system 1 is switched off.

2.5: Operation in Moving Picture Photography Mode

The moving picture photography mode is an operating mode for performing moving picture photography. In moving picture photography, an optical image is formed on the imaging sensor 11, and image data is continuously produced by the imaging sensor 11, so in moving picture photography mode the quick return mirror 23 has to be retracted out of the optical path. Accordingly, the moving picture photography mode can be considered as a type of monitor photography mode.

When the camera system 1 is in the viewfinder photography mode when the operating mode has been switched to moving picture photography mode, the camera system 1 automatically changes to monitor photography mode so that the user can view the subject on the display unit 20. More specifically, when the quick return mirror 23 is disposed in the optical path after the moving picture photography mode has been selected with the mode switching dial 26, the quick return mirror controller 36 retracts the quick return mirror 23 out of the optical path on the basis of a command from the body microcomputer 10, and the camera system 1 automatically changes to the monitor photography mode.

In this state, the image data produced by the imaging sensor 11 is displayed as a through-image on the display unit 20. Since this through-image is displayed in real time on the display unit 20, the user can determine the composition for capturing a moving picture while looking at the display unit 20, and can clock the timing of the start of moving picture recording. In moving picture photography mode, when the user presses the release button 30 all the way down, moving picture recording is started with this camera system 1.

Also, when the moving picture photography button 35 is pressed, the operating mode automatically changes to the moving picture photography mode, and the recording of a moving picture is commenced. More specifically, if the quick return mirror 23 is disposed in the optical path of the imaging optical system L when the moving picture photography button 35 is pressed, the quick return mirror controller 36 retracts the quick return mirror 23 out of the optical path on the basis of a command from the body microcomputer 10. After the quick return mirror 23 is retracted, the recording of a moving picture is automatically commenced.

Once moving picture recording starts, the image data produced by the imaging sensor 11 is outputted at a specific frame rate, and the recording of moving picture data to an image recorder is commenced. While the moving picture is being recorded, autofocusing by the above-mentioned contrast method is carried out periodically, so the focal state is kept at a specific level during moving picture recording.

2.6: Determining Moving Picture Photography Compatibility

Figure 12:
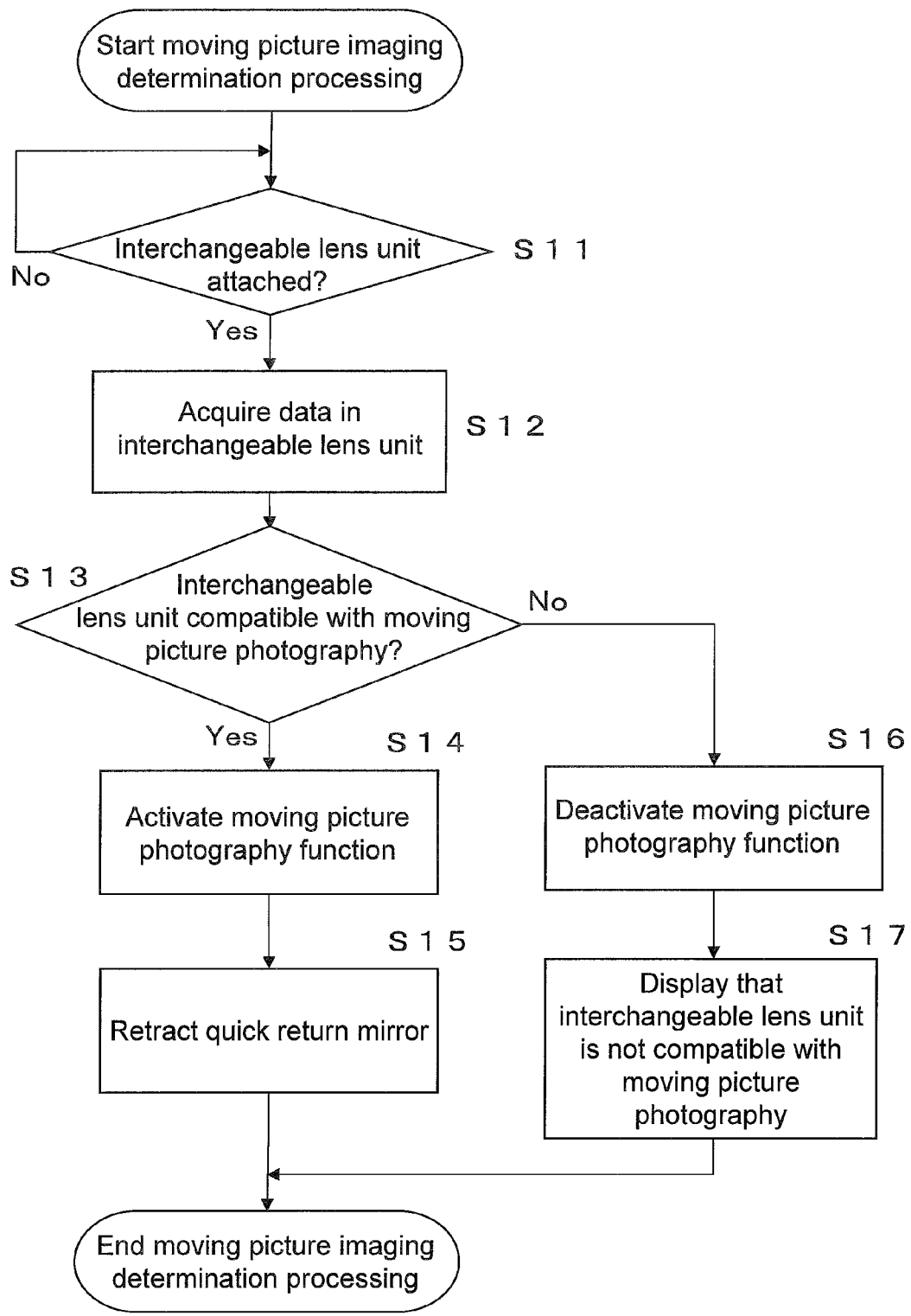
FIG. 12 is a flowchart of moving picture imaging determination processing.

To perform moving picture photography, the camera body 3 determines whether or not the interchangeable lens unit 2 has a moving picture photography function. More specifically, with this camera system 1, if the interchangeable lens unit 2 is compatible with moving picture photography, the operating mode automatically changes to moving picture photography mode when the interchangeable lens unit 2 is attached to the camera body 3. The operation of the camera system 1 (moving picture photography determination processing) in determining whether or not moving picture photography is possible will now be described through reference to FIG. 12. FIG. 12 is a flowchart of moving picture photography determination processing.

As shown in FIG. 12, the body microcomputer 10 of the camera body 3 determines whether or not the interchangeable lens unit 2 has been attached (S11). If it is determined that the interchangeable lens unit 2 has been attached, the body microcomputer 10 acquires the lens information stored in the memory 44 of the interchangeable lens unit 2 (S12). The body microcomputer 10 determines on the basis of the acquired lens information whether or not the interchangeable lens unit 2 is compatible with moving picture photography (S13).

This lens information includes information related to whether or not the lens is compatible with moving picture photography as discussed above. For example, this information is recorded to a specific address in the memory 44 of the lens microcomputer 40. More specifically, if the interchangeable lens unit 2 is compatible with moving picture photography, information indicating that it is compatible with moving picture photography is recorded to a specific address. On the other hand, if the interchangeable lens unit 2 is not compatible with moving picture photography, no information to that effect is recorded to any specific address. Therefore, in a state in which the specific address is not being used, it is determined that the interchangeable lens unit 2 is not compatible with moving picture photography.

If the mounted interchangeable lens unit 2 is compatible with moving picture photography, the moving picture photography function is activated by the body microcomputer 10 (S14). More specifically, when the moving picture photography mode is selected with the mode switching dial 26, the body microcomputer 10 enables moving picture photography and does not restrict the setting of the operating mode to the moving picture photography mode. In other words, the body microcomputer 10 can control the operation of the various components on the basis of control information related to moving picture photography. For instance, the moving picture photography can be started and stopped by pressing the release button 30 all the way down.

If the interchangeable lens unit 2 is compatible with moving picture photography, the quick return mirror 23 is automatically retracted out of the optical path (S15). More specifically, the body microcomputer 10 sends the quick return mirror controller 36 a signal to retract the quick return mirror 23. On the basis of this retraction signal, the quick return mirror 23 is flipped up and out of the optical path by the quick return mirror controller 36. As a result, light that has passed through the imaging optical system L is incident on the imaging sensor 11, and a real-time image of the subject is displayed on the display unit 20.

In this embodiment, the moving picture photography can be started and stopped by pressing the moving picture photography button 35, rather than the release button 30. In this case, even if the still picture photography mode or the reproduction mode has been selected, the operating mode changes forcibly to moving picture photography mode and the moving picture photography can be started by pressing the moving picture photography button 35. This allows moving picture photography to be started instantly when a situation calls for instant reaction, and the convenience of moving picture photography can still be enhanced. Also, when the interchangeable lens unit 2 is attached to the camera body 3, the message to the effect that the moving picture photography is possible may be displayed on the display unit 20.

Conversely, if the interchangeable lens unit 2 is not compatible with moving picture photography, the body microcomputer 10 deactivates the moving picture photography function (S16). Specifically, even if the moving picture photography mode has been selected with the mode switching dial 26, the body microcomputer 10 gives priority to a determination based on lens information, and restricts switching to the moving picture photography mode. In other words, even if control information related to moving picture photography is inputted, the camera system 1 will be in a state in which a moving picture cannot be captured. The fact that the mounted interchangeable lens unit 2 is not compatible with moving picture photography is also displayed on the display unit 20 (S17). Or, the fact that the interchangeable lens unit 2 is not compatible with moving picture photography may be displayed when the moving picture photography button 35 is pressed.

As discussed above, when the interchangeable lens unit 2 is attached, the camera body 3 determines whether or not moving picture photography is possible on the basis of lens information stored in the interchangeable lens unit 2. If the interchangeable lens unit 2 is not compatible with moving picture photography, then when the interchangeable lens unit 2 is attached to the camera body 3, the operating mode automatically switches to moving picture photography mode. This enhances convenience of moving picture photography.

2.7: External Monitor Detection Processing

Figure 13:
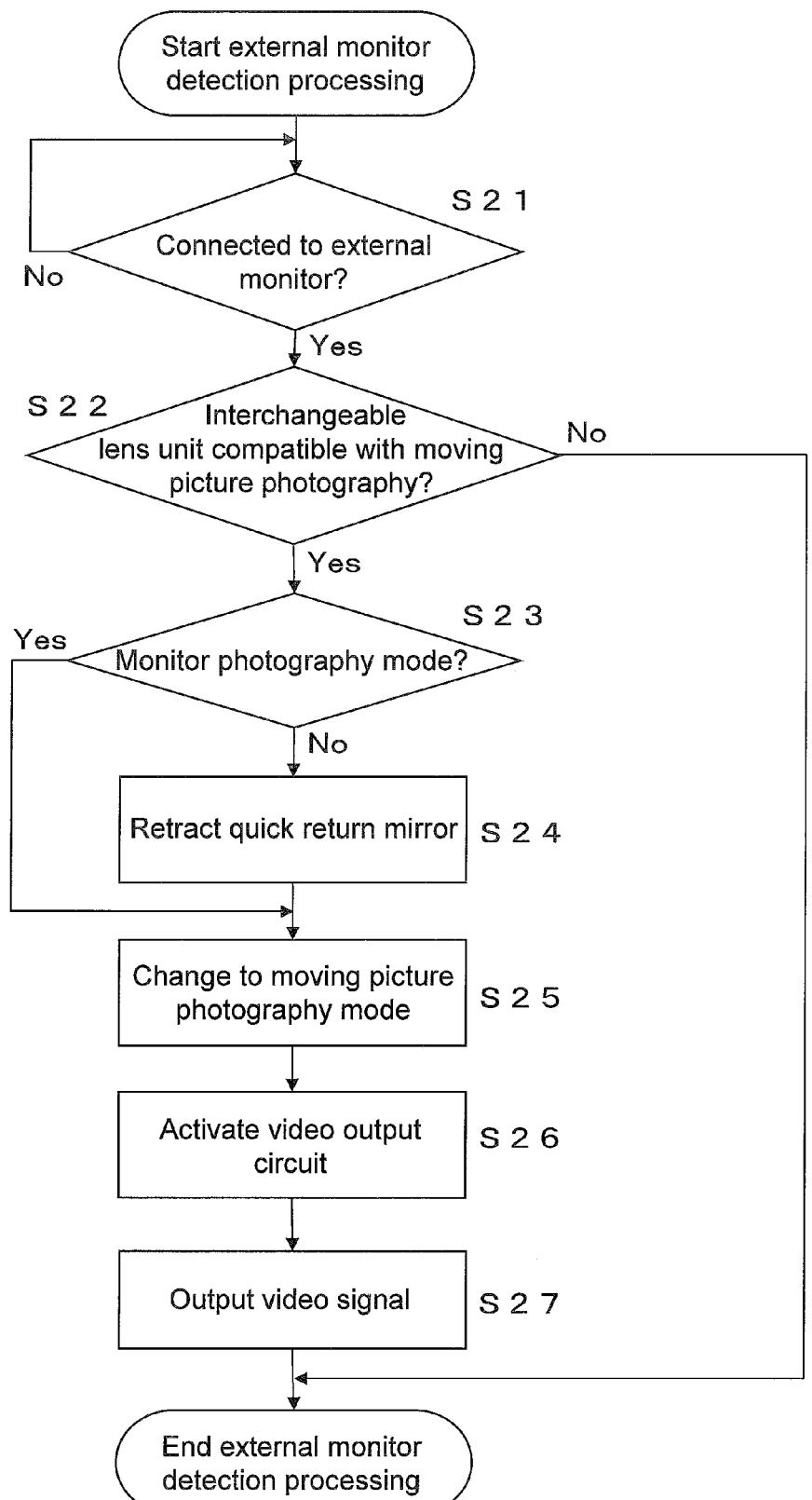
FIG. 13 is a flowchart of external monitor detection processing.
Figure 14:
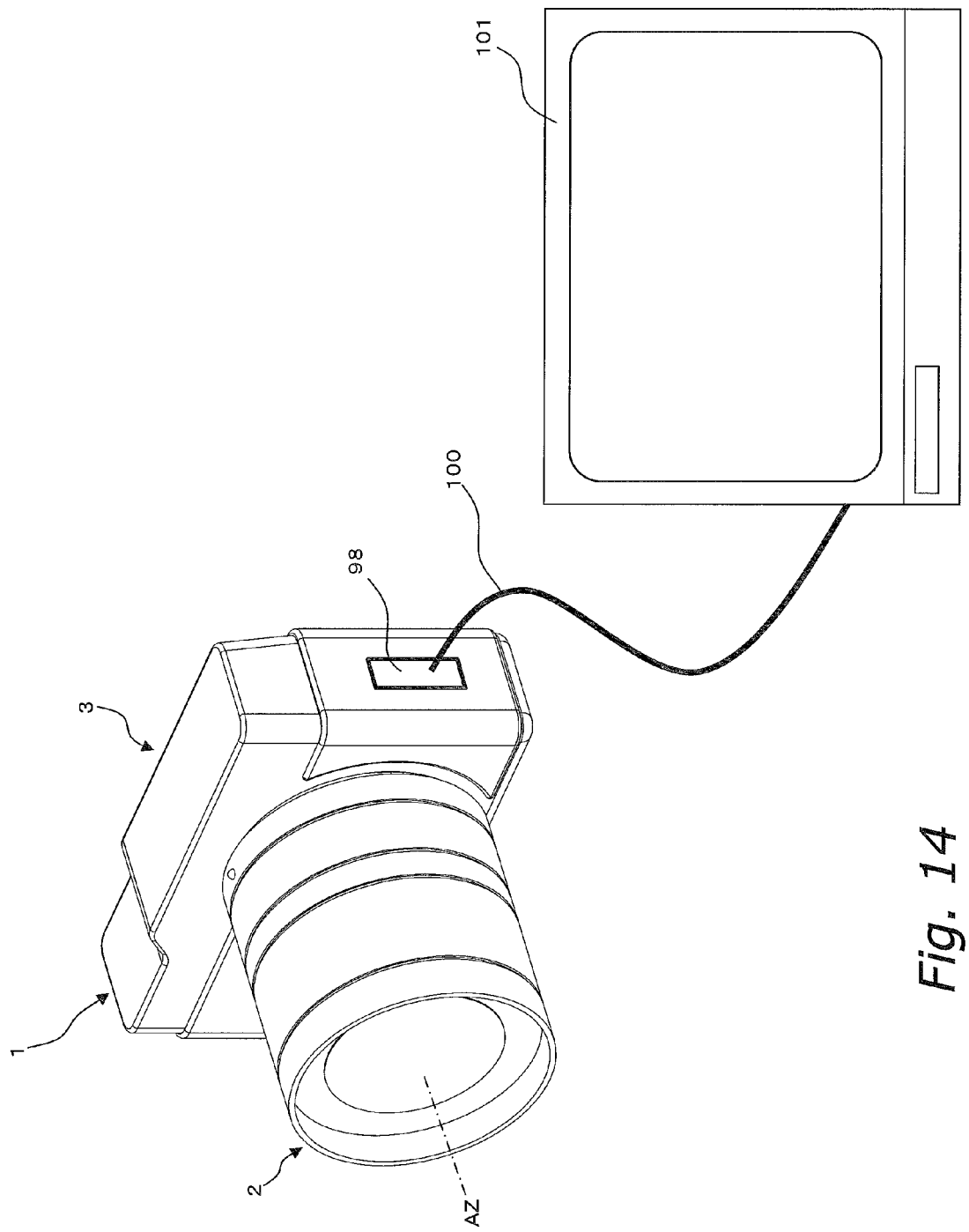
FIG. 14 is a diagram illustrating the connection of a camera system and an external monitor via an AV cable.

Next, the operation of the camera system 1 when it is determined whether or not AV output is possible will be described through reference to FIGS. 13 and 14, for when the user outputs video and audio to an external monitor 101 (external monitor detection processing). FIG. 13 is a flowchart of external monitor detection processing, and FIG. 14 is a diagram of when the camera system 1 is connected to the external monitor 101 via the AV cable 100.

As shown in FIG. 13, the body microcomputer 10 of the camera body 3 determines whether or not the camera body 3 is connected to the external monitor 101 (S21). More specifically, the body microcomputer 10 monitors the voltage level at the input terminal of an AV cable connection detecting circuit 97. As discussed above, when the AV cable 100 is connected to the AV output terminal 98, the voltage level drops at the input terminal of the AV cable connection detecting circuit 97. Thus, the body microcomputer 10 determines whether or not the AV cable 100 is connected to the AV output terminal 98. If it is determined that the camera body 3 is connected to an external monitor, then it is determined whether or not the interchangeable lens unit 2 is compatible with moving picture photography (S22). If the interchangeable lens unit 2 is not compatible with moving picture photography, a message to the effect that it is not compatible with moving picture photography is displayed on the display unit 20, and the external monitor detection processing is ended.

If the interchangeable lens unit 2 is compatible with moving picture photography, the body microcomputer 10 determines whether or not the current photography mode is the monitor photography mode (S23). If the photography mode is not the monitor photography mode, the quick return mirror controller 36 automatically retracts the quick return mirror 23 out of the optical path on the basis of a command from the body microcomputer 10 (S24).

It is also possible to determine whether or not the photography mode is the monitor photography mode by checking the status of the quick return mirror 23. Since the status of the quick return mirror 23 is switched by the quick return mirror controller 36 on the basis of a command from the body microcomputer 10, the body microcomputer 10 can ascertain the status of the quick return mirror 23 if the previous command has been stored ahead of time in the body microcomputer 10.

Meanwhile, if the photography mode is already the monitor photography mode, the quick return mirror 23 is already disposed outside the optical path, so step S24 is skipped.

Once the retraction of the quick return mirror 23 is complete, the body microcomputer 10 automatically switches the focus method to a contrast detection method, and the operating mode changes to the moving picture photography mode (S25). When the change to moving picture photography mode is complete, the body microcomputer 10 activates the video signal output circuit 99 (S26), and video and audio are outputted to the external monitor 101 through the AV cable 100 connected to the AV output terminal 98.

As discussed above, the camera body 3 automatically confirms that the AV cable 100 is attached, and retracts the quick return mirror 23 out of the optical path, thereby changing the optical path to the moving picture photography mode. Therefore, when the AV cable 100 is connected, the moving picture being captured can be instantly viewed by the user on the external monitor 101, without any special operation being performed.

Furthermore, the means for connecting the camera body 3 to the external monitor 101 is not limited to the AV cable 100, and a wireless LAN (not shown), for example, may be used to connect the camera body 3 to the external monitor 101. Specifically, a state in which the camera body 3 is connected to the external monitor 101 can be rephrased as a state in which it is possible to transmit images from the camera body 3 to the external monitor 101. If the connection is by wireless LAN, then it may be determined whether or not the camera body 3 is connected to an external monitor by detecting that the wireless LAN function provided to the camera system 1 has been activated. The configuration may be such that the optical path automatically changes to the moving picture photography mode when the wireless LAN function is activated. Also, it may be determined whether or not the camera body 3 is connected to the external monitor 101 by detecting that wireless communication between the camera body 3 and the external monitor 101 has begun properly.

When video and audio are being outputted to the external monitor 101, a moving picture photography menu may be separately displayed on the display unit 20 provided to the camera system 1. More specifically, the configuration may be such that the frame rate during moving picture photography or the recording pixel count, for example, can be selected on the display unit 20.

Also, the configuration may be such that if the interchangeable lens unit 2 has not been attached to the camera body 3, the operating mode automatically changes to the reproduction mode when the AV cable 100 is connected to the camera body 3. In this reproduction mode, the activation of the video signal output circuit 99 is switched by the body microcomputer 10, and the desired video and audio or still picture recorded to the image recorder 18 is outputted to the external monitor 101 through the AV cable 100 connected to the AV output terminal 98. As a result, the moving or still picture recorded to the image recorder 18 can be displayed as a visible image on the external monitor 101. Thus, even with the camera body 3 alone, an image can be reproduced by connecting the external monitor 101 to the camera body 3, which makes the camera system 1 even more convenient to use.

2.8: Display Unit Detection Processing

Figure 15:
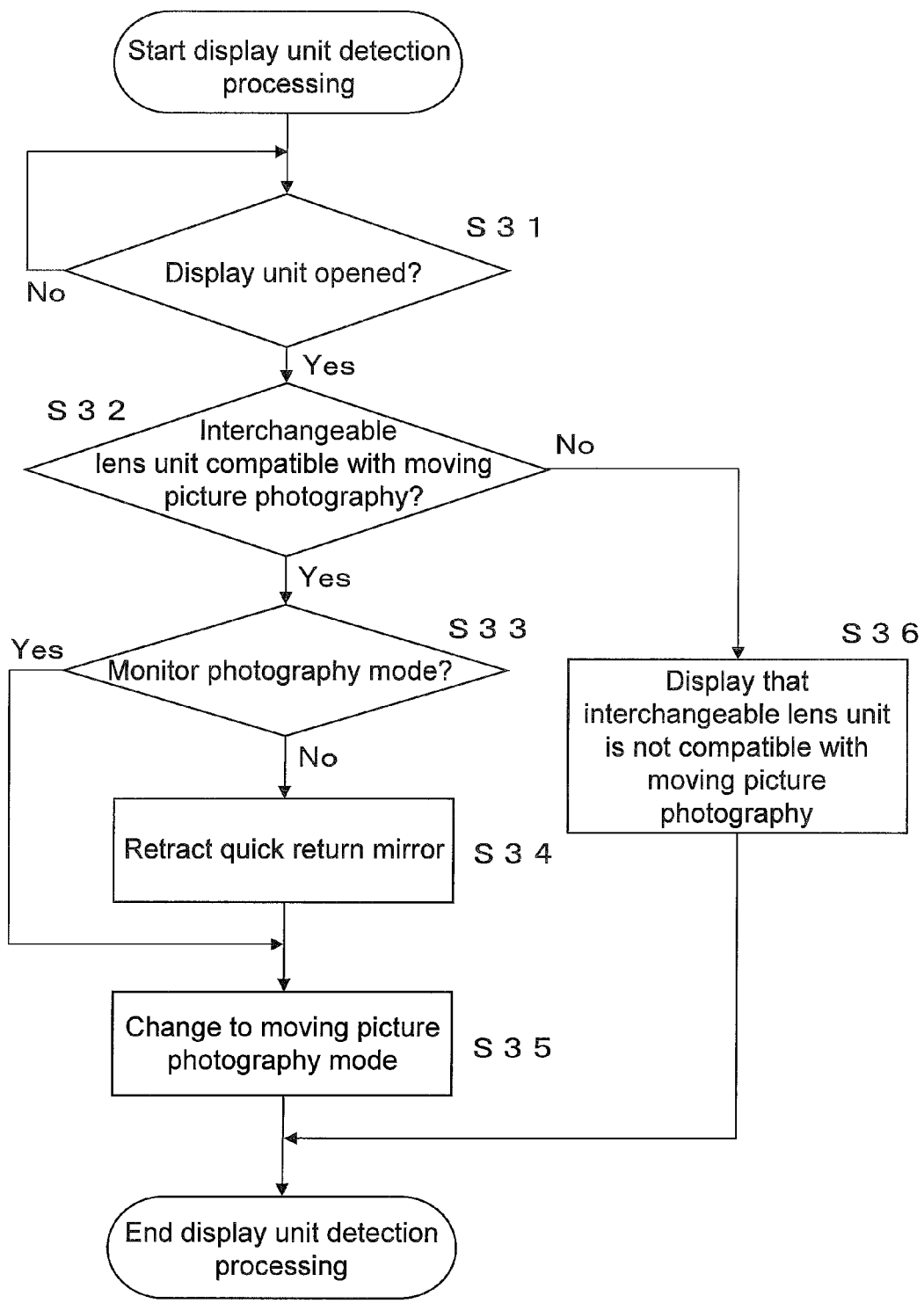
FIG. 15 is a flowchart of display unit detection processing.

Next, the operation of the camera system 1 when the user opens the display unit 20 (display unit detection processing) will be described through reference to FIGS. 15 and 16. FIG. 15 is a flowchart of display unit detection processing, and FIG. 16 is a diagram of the state of imaging when the display unit 20 has been opened.

As shown in FIG. 15, the body microcomputer 10 of the camera body 3 determines whether or not the display unit 20 has been opened (S31). If it is determined that the display unit 20 has been opened, the body microcomputer 10 determines whether or not the interchangeable lens unit 2 is compatible with moving picture photography (S32). If the interchangeable lens unit 2 is not compatible with moving picture photography, a message to the effect that it is not compatible with moving picture photography is displayed on the display unit 20 (S36), and the flow is ended.

If the interchangeable lens unit 2 is compatible with moving picture photography, the body microcomputer 10 determines whether or not the current photography mode is the monitor photography mode (S33). If the photography mode is not the monitor photography mode, the quick return mirror 23 is automatically flipped up and out of the optical path (S34).

Just as with the external monitor detection processing discussed above, it is possible to determine whether or not the photography mode is the monitor photography mode by checking the status of the quick return mirror 23. Since the status of the quick return mirror 23 is switched by the quick return mirror controller 36 on the basis of a command from the body microcomputer 10, the body microcomputer 10 can ascertain the status of the quick return mirror 23 if the previous command has been stored ahead of time in the body microcomputer 10.

Meanwhile, if the photography mode is already the monitor photography mode, the quick return mirror 23 is already disposed out of the optical path, so step S34 is skipped.

Once the retraction of the quick return mirror 23 is complete, the body microcomputer 10 automatically switches the focus method to a contrast detection method, and the operating mode changes to the moving picture photography mode (S35).

Regardless of what the operating mode is, when the display unit 20 has been opened, with this camera body 3 it is possible for the quick return mirror 23 to be automatically retracted from the optical path, and the operating mode to be automatically changed to the moving picture photography mode. Accordingly, moving picture photography can be started instantly, without any special operation being performed.

2.9: Self-Timer Determination Processing

Figure 18:
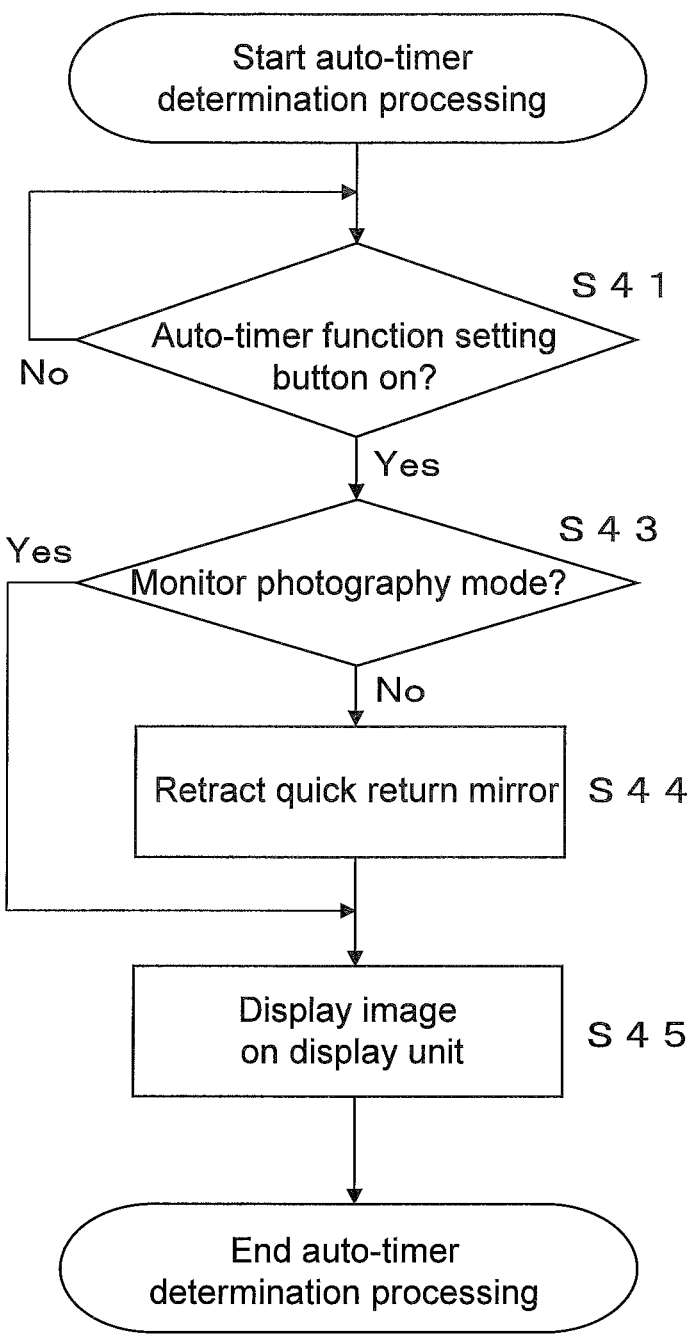
FIG. 18 is a flowchart of self-timer determination processing.

Self-timer determination processing will now be described through reference to FIG. 18. FIG. 18 is a flowchart of self-timer determination processing.

With this camera system 1, the quick return mirror 23 is automatically retracted out of the optical path in conjunction with the operation of the self-timer function setting button 95.

More specifically, as shown in FIG. 18, the body microcomputer 10 of the camera body 3 determines whether or not the self-timer function setting button 95 has been switched on (S41). If the self-timer function setting button 95 has been switched on, the body microcomputer 10 determines whether or not the current photography mode is the monitor photography mode (S43). If the photography mode is not the monitor photography mode, the quick return mirror 23 is automatically flipped up and out of the optical path (S44).

Meanwhile, if the photography mode is already the monitor photography mode, the quick return mirror 23 is already disposed outside the optical path, so step S44 is skipped. When the photography mode changes to the monitor photography mode, a real-time image of the subject is displayed on the display unit 20.

As discussed above, regardless of what the photography mode is, the quick return mirror 23 is automatically retracted out of the optical path in conjunction with the operation of the self-timer function setting button 95. Accordingly, when the self-timer function is utilized, the user can view the subject on the display unit 20 without performing any special operation, which makes the camera system 1 more convenient to use.

2.9: Zooming and Focusing

The operation of the interchangeable lens unit 2 when the user performs zooming and focusing will now be described.

Figure 17:
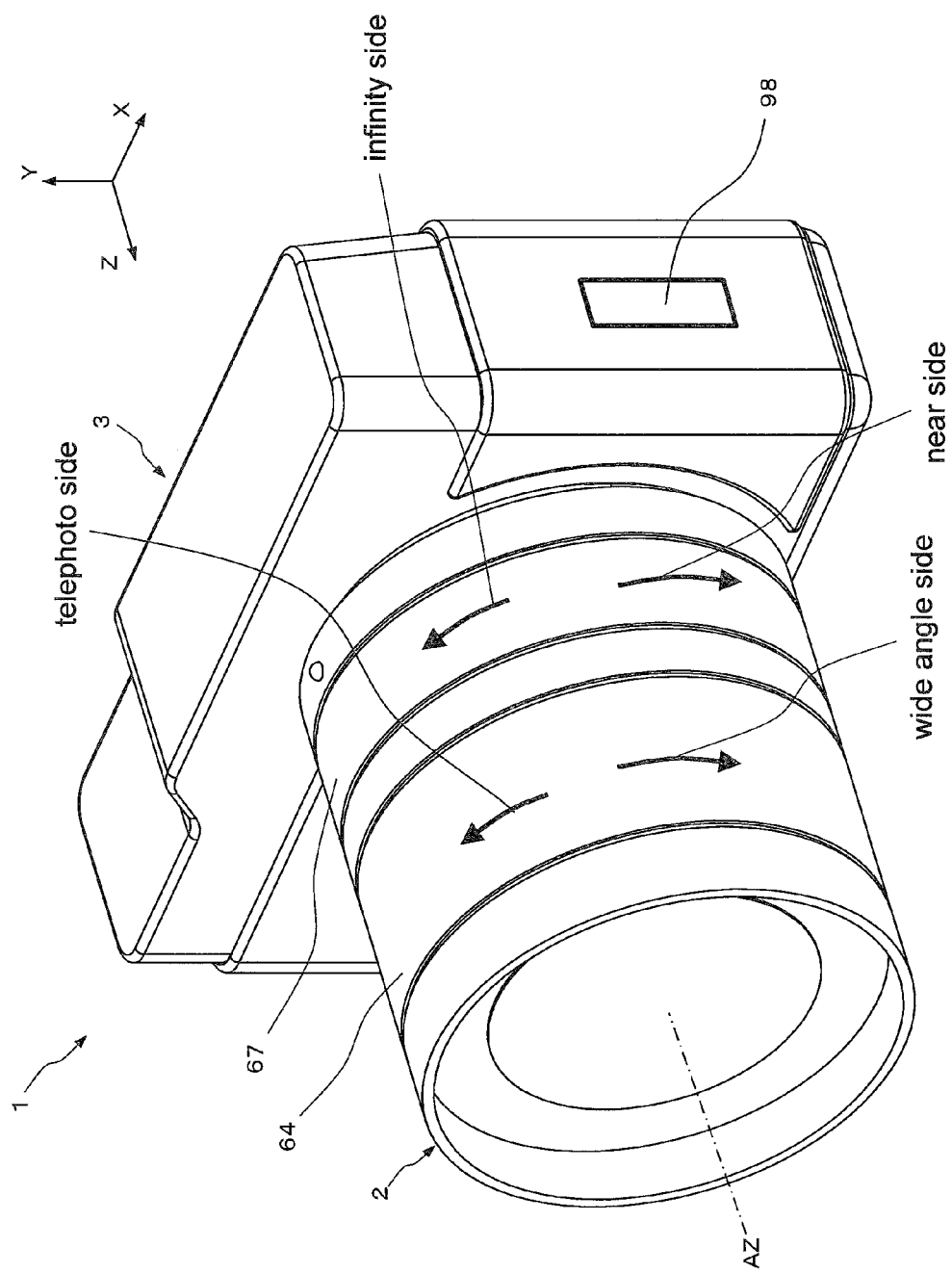
FIG. 17 is a simplified oblique view of a camera system.

As shown in FIG. 17, when the user turns the zoom ring 64, this turning motion is transmitted to the first rotary frame 53 linked to the zoom ring 64. When the first rotary frame 53 rotates around the optical axis AZ, the first rotary frame 53 is guided by the cam though-grooves 50b of the fixed frame 50, and the first rotary frame 53 moves in the Z axis direction while rotating around the optical axis AZ. Also, the first linear frame 52 rotates with respect to the first rotary frame 53 (without rotating with respect to the fixed frame 50), while moving linearly in the Z axis direction integrally with the first rotary frame 53.

When the first rotary frame 53 rotates around the optical axis AZ, the cam pins 54a are guided by the through-cam groove 53a, and the first holder 54 and the first lens support frame 57 fixed to the first holder 54 move linearly in the Z axis direction. Also, when the first rotary frame 53 rotates around the optical axis AZ, the cam pins 61a are guided by the through-cam grooves 53b, and the second holder 61 and the second lens support frame 58 move integrally and linearly in the Z axis direction. That is, the focus lens unit 78 moves in the Z axis direction.

When the first rotary frame 53 rotates around the optical axis AZ, the cam pins 59a are guided by the linear through-grooves 50a, and as the second rotary frame 55 rotates around the optical axis AZ, it moves in a direction along the optical axis AZ.

When the second rotary frame 55 rotates around the optical axis AZ, the cam pins 59a are guided by the linear through-grooves 50a, and the third lens support frame 59 moves in a direction parallel to the optical axis AZ. Also, when the third lens support frame 59 rotates around the optical axis AZ, the cam pins 60a are guided by cam grooves 60b, and the fourth lens support frame 60 moves in a direction along the optical axis AZ.

Figure 5:
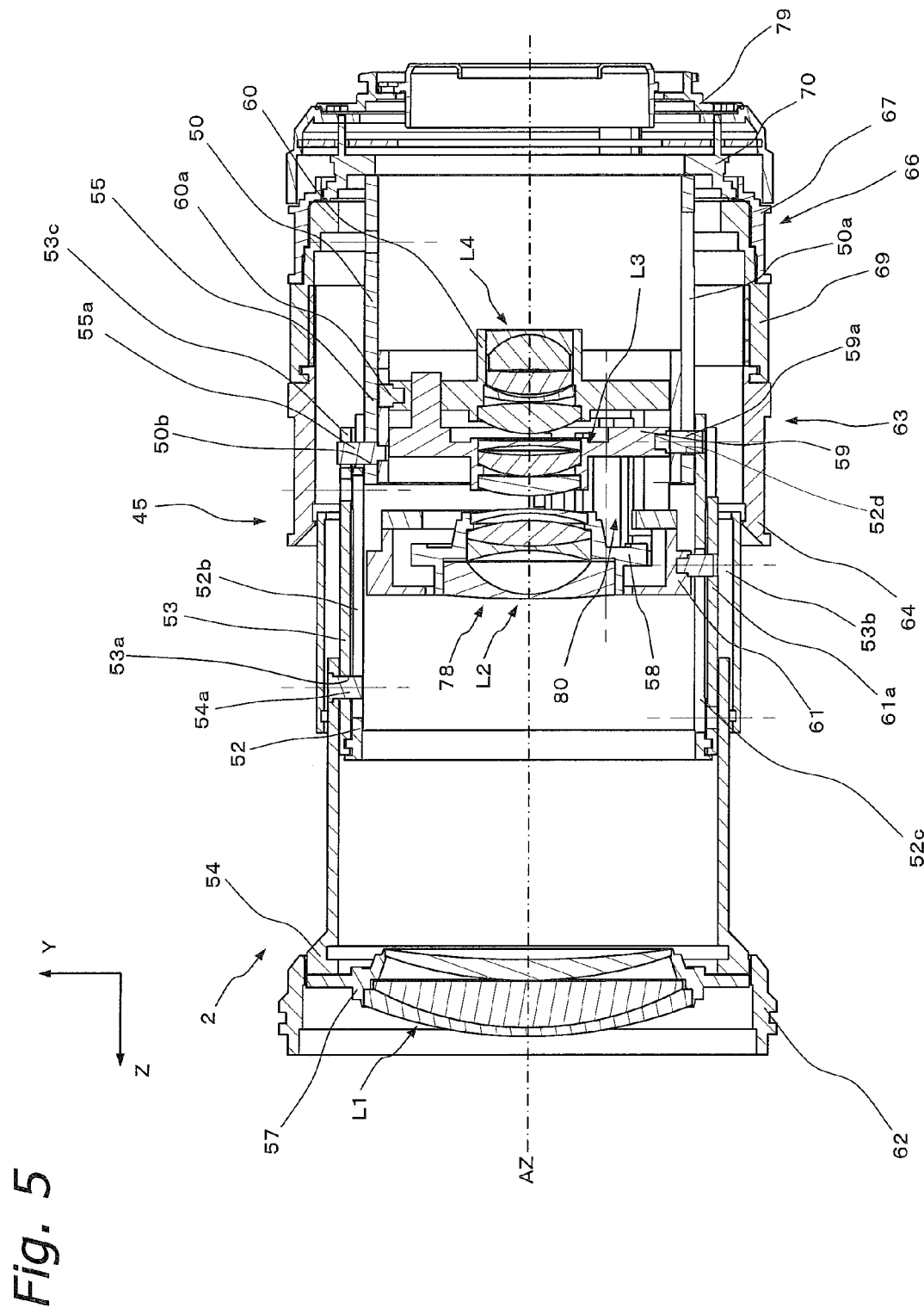
FIG. 5 is a cross section at the telephoto end of an interchangeable lens unit.

Thus, by turning the zoom ring 64 toward the telephoto side, it is possible to move the various lens groups L1 to L4 in a direction along the optical axis AZ, from the wide angle end state shown in FIG. 4 to the telephoto end state shown in FIG. 5, and capture an image at a specific zoom position.

Here, the focus lens unit 78 moves in a direction along the optical axis AZ as the zoom ring 64 rotates, a contrast detection is performed on the basis of the output of the imaging sensor 11, and the second lens group L2 is driven by the ultrasonic actuator unit 80 on the basis of the detection result. Therefore, the focal state is maintained at a specific subject distance (for example, infinity) even if the focal length changes from the wide angle end to the telephoto end, or conversely from the telephoto end to the wide angle end. In other words, when the zoom ring 64 is turned, the focus lens unit 78 moves in the Z axis direction along with the movement of the first rotary frame 53 and first linear frame 52, and only the second lens group L2 is electrically driven by the ultrasonic actuator unit 80 in the focus lens unit 78 so that the optimal focal state will be obtained. The operation of the ultrasonic actuator unit 80 is electrically controlled on the basis of a tracking table stored ahead of time in the interchangeable lens unit 2. This tracking table is stored ahead of time in the memory 44 in the lens microcomputer 40. More specifically, the relationship between information about the rotational position of the zoom ring 64 and information about the position of the second lens group L2 referenced to the lens mount 79 in the Z axis direction in the interchangeable lens unit 2 is stored in the memory 44 as table information for each subject distance. For instance, tracking information is stored for subject distances of 0.3 m, 1 m, and ∞ (infinity). The zoom ring 64 rotational position information makes use of the output from the first angle detector 65. For example, in a state of focus at a short distance of 1 m, whether the system is changed from the wide angle end to the telephoto end, or conversely from the telephoto end to the wide angle end, the focal state will be maintained at a short distance by electrical drive of the second lens group L2 by the ultrasonic actuator unit 80 on the basis of the tracking table, so the zooming operation can be carried out smoothly.

When the user turns the focus ring 67, the second angle detector 68 detects the rotational angle, and outputs a signal corresponding to this rotational angle. The lens microcomputer 40 produces a drive signal for driving the ultrasonic actuator unit 80 on the basis of the focus ring rotational angle signal. This drive signal causes the ultrasonic actuator unit 80 to move in the Z axis direction, so the second lens support frame 58 to which the ultrasonic actuator unit 80 is fixed also moves in the Z axis direction. In the wide angle end state shown in FIG. 4, the second lens group L2 is in a position where the distance to the subject is infinity, but as the distance to the subject is shortened, the second lens group L2 moves to the Z axis direction positive side. Similarly, in the telephoto end state shown in FIG. 5, the second lens group L2 is in a position where the distance to the subject is infinity, but as the distance to the subject is shortened, the second lens group L2 moves to the Z axis direction positive side. In this case, the amount of movement of the second lens group L2 is greater than in the case of the wide angle end.

The focus lens group drive controller 41 is able to receive signals from the second angle detector 68, and is able to transmit signals to the ultrasonic actuator unit 80. The focus lens group drive controller 41 sends the determination result to the lens microcomputer 40. The focus lens group drive controller 41 also drives the ultrasonic actuator unit 80 on the basis of a control signal from the lens microcomputer 40.

2.10: Focusing Operation

The focusing operation of the camera system 1 will now be described. The camera system 1 has two focus modes: an autofocus photography mode and a manual photography mode.

The user sets the desired photography mode by using the auto photography mode or manual photography mode setting button (not shown) provided to the camera body 3 or the interchangeable lens unit 2.

In auto photography mode, the lens microcomputer 40 sends a control signal to the focus lens group drive controller 41 according to operation of the moving picture photography button 35 or to the release button 30 being pressed half-way down, drives the ultrasonic actuator unit 80, and nudges the second lens group L2. The body microcomputer 10 sends a command to the digital signal processor 15. The digital signal processor 15 sends an image signal at a specific timing to the body microcomputer 10 on the basis of the received command. The body microcomputer 10 computes the amount of movement along the optical axis AZ of the second lens group L2 that will result in the imaging optical system L being in a focused state on the basis of the received image signal and focal length information received ahead of time from the zoom ring unit 63. The body microcomputer 10 produces a control signal on the basis of the computation result. The body microcomputer 10 sends this control signal to the focus lens group drive controller 41.

The focus lens group drive controller 41 produces a drive signal for driving the ultrasonic actuator unit 80 on the basis of the control signal from the body microcomputer 10. The ultrasonic actuator unit 80 is driven on the basis of this drive signal. Drive of the ultrasonic actuator unit 80 moves the second lens group L2 automatically in the Z axis direction.

As discussed above, focusing is carried out by the autofocus photography mode of the interchangeable lens unit 2 or the camera body 3. The above operation is executed instantly after the user presses the release button 30 half-way down, or presses the moving picture photography button 35. If the user presses the release button 30 all the way down, or presses the moving picture photography button 35, the body microcomputer 10 executes imaging processing, and when this imaging is complete, a control signal is sent to the image recording controller 19. The image recorder 18 records the image signal to an internal memory and/or removable memory on the basis of a command from the image recording controller 19. The image recorder 18 records information to the effect that the photography mode is the autofocus photography mode, along with the image signal, to an internal memory and/or removable memory on the basis of a command from the image recording controller 19.

On the other hand, in manual focus photography mode, the lens microcomputer 40 asks the focus lens group drive controller 41 for information about the rotational angle of the focus ring unit 66. The lens microcomputer 40 produces a control signal for moving the second lens group L2 on the basis of a detection value obtained from the rotational angle of the focus ring 67. The lens microcomputer 40 sends the control signal thus produced to the focus lens group drive controller 41.

The focus lens group drive controller 41 produces a drive signal for driving the ultrasonic actuator unit 80 on the basis of the control signal from the lens microcomputer 40. The ultrasonic actuator unit 80 is driven on the basis of this drive signal. Drive of the ultrasonic actuator unit 80 moves the second lens group L2 according to the amount and direction of rotation of the focus ring 67.

As discussed above, focusing is carried out by the manual focus photography mode of the camera system 1. In manual focusing mode, imaging is performed in the same state when the user presses the release button 30 all the way down, or presses the moving picture photography button 35.

Upon completion of the imaging, the body microcomputer 10 sends a control signal to the image recording controller 19. The image recorder 18 records the image signal to an internal memory and/or removable memory on the basis of a command from the image recording controller 19. The image recorder 18 records information to the effect that the photography mode is the manual focus photography mode, along with the image signal, to an internal memory and/or removable memory on the basis of a command from the image recording controller 19.

3. Features of Camera System

The camera system 1 described above has the following features.

(1) With this camera system 1, when the interchangeable lens unit 2 is mounted to the camera body 3, the body microcomputer 10 determines whether or not the interchangeable lens unit 2 is compatible with moving picture photography. If it is determined by the body microcomputer 10 that the interchangeable lens unit is compatible with moving picture photography, the quick return mirror controller 36 retracts the quick return mirror 23 out of the optical path of the imaging optical system L. That is, when an interchangeable lens unit 2 compatible with moving picture photography is mounted to the camera body 3, the quick return mirror 23 is automatically retracted out of the optical path, and the operating mode is automatically switched to the moving picture photography mode. Accordingly, there is no need for any operation for switching to the moving picture photography mode after the mounting of the interchangeable lens unit 2, and this makes the camera system 1 more convenient to use.

In particular, when the interchangeable lens unit 2 is a moving picture photography-dedicated lens that is only compatible with moving picture photography, there is no need to switch the operating mode to the moving picture photography mode, which makes the camera system 1 more convenient to use.

Also, there are already many interchangeable lens units that are not compatible with moving picture photography, but with this camera system 1, if an interchangeable lens unit that is not compatible with moving picture photography is mounted to the camera body 3, the body microcomputer 10 deactivates the moving picture photography function, so the system remains usable. Accordingly, an interchangeable lens unit that was purchased previously will not go to waste, and this provides the user with a more useful camera system.

(2) With this camera system 1, when the moving picture photography button 35 is pressed, the quick return mirror controller 36 retracts the quick return mirror 23 out of the optical path, and then moving picture photography is commenced. Therefore, it takes less time until the start of moving picture photography.

(3) With this camera system 1, when the AV cable connection detecting circuit 97 detects that the external monitor 101 has been connected to the AV output terminal 98 of the camera body 3, the quick return mirror controller 36 retracts the quick return mirror 23 out of the optical path of the optical system. As a result, the user can view the subject on the external monitor 101 merely by connecting the external monitor 101 to the camera body 3. This makes the camera system more convenient to use.

(4) As discussed above, the display unit 20 can be in either a closed state in which it is disposed parallel to the rear face of the case 3a, or an open state in which it is disposed tilted and facing upward with respect to the rear face of the case 3a. When the user captures an image while viewing the subject on the display unit 20, it is anticipated that the display unit 20 will usually be in its open state.

With this camera system 1, when the display unit 20 is put in an open state with respect to the case 3a, the open/closed detection sensor 111 detects the change in the position of the display unit 20. On the basis of this detection result, the quick return mirror 23 is automatically retracted from the optical path of the imaging optical system L. As a result, the user can view the subject on the display unit 20 by putting the display unit 20 in its open state. Consequently, when the display unit 20 is opened and moving picture photography is performed, there is no need to switch the optical path to the moving picture photography mode, and this makes the camera system 1 more convenient to use.

(5) When the self-timer function is used to capture an image, since the camera system 1 itself is placed somewhere by the user, in this case it is preferable to view the subject on the display unit 20.

With this camera system 1, when the self-timer function setting button 95 is pressed, the quick return mirror 23 is automatically retracted out of the optical path of the optical system. Therefore, when the self-timer function is used for image capture, there is no need to switch the optical path to the monitor photography mode, and this makes the camera system 1 more convenient to use.

(6) With this camera system 1, if the interchangeable lens unit 2 is not compatible with moving picture photography, a message to that effect will be displayed on the display unit 20, so the user can find out that the interchangeable lens unit 2 is not compatible with moving picture photography merely by mounting the interchangeable lens unit 2 to the camera body 3. The user can also check whether or not the interchangeable lens unit is compatible with moving picture photography, by mounting the interchangeable lens unit 2 to the camera body 3.

Other Embodiments

The single lens reflex camera, camera body, and interchangeable lens pertaining to the present invention are not limited to the embodiment given above, and various modifications and changes are possible without departing from the gist of the invention.

Furthermore, components that have substantially the same function as in the above embodiment will be numbered the same, and not described in detail again.

(1) In the above embodiment, if the interchangeable lens unit 2 is not compatible with moving picture photography, the quick return mirror 23 is automatically retracted out of the optical path when the interchangeable lens unit 2 is mounted to the camera body 3.

However, the camera system 1 need not have a constitution in which the quick return mirror 23 is automatically retracted out of the optical path upon the mounting of the interchangeable lens unit 2, and the convenience of the camera system can still be enhanced.

For example, as shown in FIG. 13, the convenience of the camera system 1 can be enhanced if the constitution is such that the quick return mirror 23 is automatically retracted out of the optical path when the external monitor 101 is connected to the camera body 3 via the AV cable 100.

Similarly, as shown in FIG. 15, the convenience of the camera system 1 can be enhanced if the constitution is such that the quick return mirror 23 is automatically retracted out of the optical path of the imaging optical system L on the basis of the detection result of the open/closed detection sensor 111.

Furthermore, as shown in FIG. 18, if the constitution is such that the quick return mirror 23 is automatically retracted out of the optical path when the mode is set to self-timer photography mode with the self-timer function setting button 95, then the user can view the subject on the display unit 20 without any extra operation when capturing an image with the self-timer function. Here again, the convenience of the camera system 1 can be enhanced.

(2) In the above embodiment, if a remote control switch is connected to the camera body 3, then moving picture photography can be performed using a tripod, and more particularly, in low-angle photography in which the display unit 20 is used in its open state. In this case, when it is detected that the remote control switch is connected to the camera body 3, the quick return mirror 23 may be automatically retracted out of the optical path and the mode changed to monitor photography mode. In this case, the convenience of the camera system can be further enhanced because using the remote control switch allows the user to perform low-angle photography while looking at a live view image with the display unit 20 in its open state.

(3) In the above embodiment, the focal length is manually adjusted with a zoom ring, but there is no need to limit to this, and an electronic zoom may be used instead.

(4) In the above embodiment, the various setting menus for moving picture photography can be set using the display unit on the basis of whether or not moving picture photography is possible with the interchangeable lens unit.

(5) In the above embodiment, an ultrasonic actuator is used as the actuator for focusing, but this may be another actuator that allows the focus lens group to be directly driven, such as a stepping motor.

(6) In the above embodiment, the focus lens group was the second lens group L2, but there is no need to limit to this, and it may instead be the third lens group L3, the fourth lens group L4, or another lens group. Also, a case was described in which there was only one second lens group L2 as the focus lens group, but a plurality of lens groups may work together to constitute an optical system that performs focusing.

(7) In the above embodiment, an image blur correction unit may be provided to the interchangeable lens unit 2, to the camera body 3, or to both. If to both, the camera system may be such that either image blur correction unit can be selected.

(8) In the above embodiment, if the shutter drive motor 32 is constituted by an independent motor, a silent mode may be provided in the monitor photography mode. Specifically, if the user sets the silent mode, then when there is an automatic change to the monitor photography mode, the operation of the quick return mirror 23 will make no noise when the release button 30 is pressed. Accordingly, photography will be possible even in quiet surroundings, without worry about noise from the quick return mirror 23.

Also, when the image blur correction unit is operated, photography in the monitor photography mode will prevent the impact caused by operation of the quick return mirror 23 from adversely affecting the image blur correction unit, so the effect thereof is better.

(9) In the above embodiment, the exposure time of the imaging sensor is controlled by operating the shutter unit, but there is no need to limit to this, and the exposure time of the imaging sensor may instead be controlled by an electronic shutter or the like.

(10) In the above embodiment, the lens information includes information about whether or not there is compatible with moving picture photography. However, whether or not there is compatibility with moving picture photography may be determined from whether or not the drive system of the second lens group L2 (focus lens group), or the focus lens group drive controller 41 or the like is compatible with a contrast detection method.

(11) In the above embodiment, the interchangeable lens unit 2 is compatible with moving picture photography, but there may be cases in which only the camera body 3 is compatible with moving picture photography and the interchangeable lens unit 2 is not compatible with moving picture photography.

(12) In the flowchart of FIG. 12, after the moving picture photography function is activated in step S14, the quick return mirror 23 is retracted out of the optical path in step S15. However, the order of steps S14 and S15 may be reversed.

(13) In the above embodiment, video and audio are outputted from the camera body 3 to the external monitor 101, but the constitution may be such that only video is outputted.

What is claimed is:

1. A camera body used in a camera system along with an interchangeable lens unit having an optical system configured to form an optical image of a subject, said camera body comprising:
    an imaging unit configured to convert the optical image into an image signal and acquire an image of the subject;
    an autofocusing unit configured to detect a best focus in autofocusing operation by contrast method by using the imaging unit;
    a still picture photography mode select section configured to be set for capturing a still picture;
    a moving picture photography mode select section configured to capture a moving picture when the reflecting mirror is in a second state of being out of the optical path of the optical system;
    a display unit configured to display the image captured by the imaging unit as a through image in a moving picture photography mode;
    a recorder configured to record the still image and the moving picture;
    a mirror controller configured to retract the reflecting mirror out of the optical path of the optical system when the reflecting mirror is in a first state of being in the optical path of the optical system and the moving picture photography mode is selected, in the still picture photography mode;
    an image recording controller configured to perform the autofocusing operation by contrast method and make the recorder to record moving images depending on an instruction of the moving picture photography when the moving picture photography mode is selected and the mirror controller retracts the reflecting mirror out of the optical path of the optical system, in the still picture photography mode; and
    a focal point detection unit configured to detect the focal point, wherein
    the autofocusing method is switched from a phase difference detection method by using the focal point detection unit to the contrast method when the moving picture photography mode is selected.

2. A camera system, comprising:
    an optical system configured to form an optical image of a subject;
    an imaging unit configured to convert the optical image into an image signal and acquire an image of the subject;
    an autofocusing unit configured to detect a best focus in autofocusing operation by contrast method by using the imaging unit;
    a still picture photography mode select section configured to be set for capturing a still picture;
    a moving picture photography mode select section configured to capture a moving picture when the reflecting mirror is in a second state of being out of the optical path of the optical system;
    a display unit configured to display the image captured by the imaging unit as a through image in a moving picture photography mode;
    a recorder configured to record the still image and the moving picture;
    a mirror controller configured to retract the reflecting mirror out of the optical path of the optical system when the reflecting mirror is in a first state of being in the optical path of the optical system and the moving picture photography mode is selected, in the still picture photography mode;
    an image recording controller configured to perform the autofocusing operation by contrast method and make the recorder to record moving images depending on an instruction of the moving picture photography when the moving picture photography mode is selected and the mirror controller retracts the reflecting mirror out of the optical path of the optical system, in the still picture photography mode; and
    a focal point detection unit configured to detect the focal point, wherein
    the autofocusing method is switched from a phase difference detection method by using the focal point detection unit to the contrast method when the moving picture photography mode is selected.

\* \* \* \* \*